United States Patent
Ward et al.

(10) Patent No.: US 10,248,621 B2
(45) Date of Patent: Apr. 2, 2019

(54) SYSTEMS AND METHODS FOR STORING, UPDATING, SEARCHING, AND FILTERING TIME-SERIES DATASETS

(71) Applicant: Moonshadow Mobile, Inc., Eugene, OR (US)

(72) Inventors: Roy W. Ward, Eugene, OR (US); David S. Alavi, Eugene, OR (US)

(73) Assignee: MOONSHADOW MOBILE, INC., Eugene, OR (US)

( * ) Notice: Subject to any disclaimer, the term of this patent is extended or adjusted under 35 U.S.C. 154(b) by 408 days.

(21) Appl. No.: 15/019,965

(22) Filed: Feb. 9, 2016

(65) Prior Publication Data
US 2017/0228405 A1    Aug. 10, 2017

(51) Int. Cl.
| G06F 16/00 | (2019.01) |
|---|---|
| G06F 16/22 | (2019.01) |
| G06F 16/2458 | (2019.01) |
| G06F 16/27 | (2019.01) |
| G06F 16/23 | (2019.01) |

(52) U.S. Cl.
CPC ...... G06F 16/2228 (2019.01); G06F 16/2474 (2019.01); G06F 16/2379 (2019.01)

(58) Field of Classification Search
CPC ......... G06F 17/30454; G06F 17/30477; G06F 17/30551; G06F 17/30616; G06F 16/313; G06F 16/27
USPC .................................................. 707/746, 754
See application file for complete search history.

(56) References Cited

U.S. PATENT DOCUMENTS

| 8,977,656 | B2 | 3/2015 | Ward |
|---|---|---|---|
| 8,990,204 | B1 | 3/2015 | Ward |
| 9,002,859 | B1 | 4/2015 | Ward |
| 9,171,054 | B1 | 10/2015 | Ward |
| 9,411,898 | B1 | 8/2016 | Ward |
| 9,524,326 | B2 * | 12/2016 | Haas ...................... G06F 16/27 |
| 9,607,067 | B2 * | 3/2017 | Haas ...................... G06F 16/27 |
| 9,626,401 | B1 | 4/2017 | Ward |
| 9,652,467 | B2 | 5/2017 | Ward et al. |
| 9,697,250 | B1 | 7/2017 | Ward |
| 2004/0078364 | A1 * | 4/2004 | Ripley ............. G06F 17/30477 |
| 2008/0208820 | A1 * | 8/2008 | Usey .................... G06F 16/313 |

(Continued)

FOREIGN PATENT DOCUMENTS

WO    WO 2012/097009 A2    7/2012

OTHER PUBLICATIONS

International Search Report and dated May 29, 2017 in counterpart App No. PCT/US2017/016625.
Co-owned U.S. Appl. No. 15/233,047, filed Aug. 10, 2016 by Ward.

*Primary Examiner* — Hanh B Thai
(74) *Attorney, Agent, or Firm* — David S. Alavi

(57) ABSTRACT

A method includes generating from a time-series dataset multiple corresponding time-slice datasets. Each time-slice dataset has a corresponding time-slice time index and includes field-value data strings and associated field-value-time-index data strings, or pointers indicating the corresponding strings in an earlier time-slice dataset, that are the latest in the time-series dataset that are also earlier than the corresponding time-slice time index. A query of the time-series dataset for latest data records earlier than a given query time index is performed by using the time-slice datasets to reduce or eliminate the need to directly access or interrogate the time-series dataset.

49 Claims, 8 Drawing Sheets

(56) References Cited

U.S. PATENT DOCUMENTS

| | | | |
|---|---|---|---|
| 2012/0226693 A1* | 9/2012 | Zhang | G06F 17/30454 707/737 |
| 2014/0040276 A1 | 2/2014 | Chen et al. | |
| 2015/0169683 A1* | 6/2015 | Chandramouli | G06F 17/30551 707/713 |
| 2015/0324439 A1 | 11/2015 | Bhave et al. | |
| 2015/0339351 A1 | 11/2015 | Swan et al. | |

* cited by examiner

SYSTEMS AND METHODS FOR STORING, UPDATING, SEARCHING, AND FILTERING TIME-SERIES DATASETS

FIELD OF THE INVENTION

The field of the present invention relates to time-series datasets. In particular, systems and methods are disclosed for storing, updating, searching, and filtering time-series datasets.

BACKGROUND

Time-series datasets are generated in a wide variety of circumstances, and can be used for analysis and control. One broad arena which is expected to generate vast amounts of time-series data is the so-called Internet-of-Things (IoT), in which large numbers of devices of many disparate sorts are provided with network connectivity to provide monitoring or control. In many examples, position data can be included in time-series datasets (e.g., geo-coordinates such as latitude and longitude, perhaps elevation or altitude as well). A few examples (by no means exhaustive) of areas in which time-series datasets might be generated and exploited include the following, some of which overlap with one another.

In so-called Connected Transportation, time-series datasets can include vital statistics or operating parameters for automobiles, trucks, trains (or individual locomotives or rail cars), aircraft, boats, and ships, and so forth. Those time-series datasets can be analyzed for predictive diagnosis, scheduling maintenance, failure predication or analysis, accident investigation and analysis, and the like. Position coordinates included in a time-series dataset can be employed for vehicle navigation, traffic flow management, fleet or asset management, personnel management, scheduling, and so forth.

In so-called Smart Cities, time-series datasets can include parking availability, traffic patterns, monitoring of buildings, roads, bridges, powerlines and power grids, telecommunications grids, water and sewer lines, gas lines, or other infrastructure, water quality monitoring, noise levels, lighting conditions and resources, trash or garbage accumulation, and so forth. Those time-series datasets can be employed to monitoring conditions for incident management, maintenance scheduling, load balancing, failure warning or prediction, leak-detection, optimized weather- and time-dependent street lighting, refuse pickup, usage analysis, and so forth. Position coordinates can be advantageously included in some of those time-series datasets.

In so-called Smart Environment, time-series datasets can include forest weather conditions (temperature, humidity, cloud conditions, precipitation), conditions, soil moisture, rainfall monitoring, waterway flow rates or water levels, flood prediction or monitoring, snowpack levels, avalanche conditions, landslide conditions, seismic monitoring, combustion gas monitoring, pollen levels, airborne or waterborne levels of $CO_2$, methane, other hydrocarbons, or other volatile organic compounds (VOCs), sulfur or nitrogen oxides, soot or other particulates, ozone, or other pollutants, and so forth. Those time-series datasets can be employed to for planning, analyzing, or evaluating in order to provide a variety of warnings, management, remediation, mitigation, or other functions. Position coordinates can be advantageously included in some of those time-series datasets.

In industrial settings, time-series datasets can include operational parameters, equipment or machinery conditions or operation, tank, storage, pipeline, or supply line monitoring (oil, gas, water, chemical feedstocks, etc.), leak or spill detection, mitigation, or remediation (especially explosive, combustible, toxic, or radioactive materials), power generation (coal, natural gas, nuclear, solar, wind), airborne or waterborne levels of $CO_2$, methane, other hydrocarbons, or other volatile organic compounds (VOCs), sulfur or nitrogen oxides, soot or other particulates, ozone, or other pollutants, leakage from a water line or a roof/window leak, corrosion detection, and so forth. Position coordinates can be advantageously included in some of those time-series datasets.

In retail or logistics settings, time-series datasets can include product location (warehouse, retail outlet, in-transit, etc.), product rotation or disposal, supply chain monitoring or control, restocking, monitoring shipments (location, handling, vibration, cold chain maintenance, container openings, and so on), location or contents of specific truck trailers, rail cars, or shipping containers, asset monitoring (via RFID tags, barcodes, and the like), fleet or personnel management, and so forth. Position coordinates can be advantageously included in some of those time-series datasets.

In agricultural or animal husbandry settings, time-series datasets can include rainfall and soil moisture monitoring, weather monitoring, soil chemistry, pH, or microbial conditions, green house temperature and humidity, hydroponics conditions, micro-climate control, temperature and humidity control of crop, grain, hay, straw, alfalfa storage, irrigation control or monitoring, location, identification, fertility, or health of livestock, and so forth. Position coordinates can be advantageously included in some of those time-series datasets.

In health care settings, time-series datasets can include patient data (historical or nearly real-time) such as height, weight, blood pressure, heart rate, blood chemistry, blood oxygenation, and so on, fall detection, patient surveillance (in hospital or other facility or at home), medical or surgical history, and so on.

SUMMARY

A method includes generating from a time-series dataset multiple corresponding time-slice datasets. Each time-slice dataset has a corresponding time-slice time index and includes field-value data strings and associated field-value-time-index data strings, or pointers indicating the corresponding strings in an earlier time-slice dataset, that are the latest in the time-series dataset that are also earlier than the corresponding time-slice time index. A query of the time-series dataset for latest data records earlier than a given query time index is performed by using the time-slice datasets to reduce or eliminate the need to directly access or interrogate the time-series dataset.

Objects and advantages pertaining to storing, updating, searching, and filtering time-series datasets may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

Figure 1:
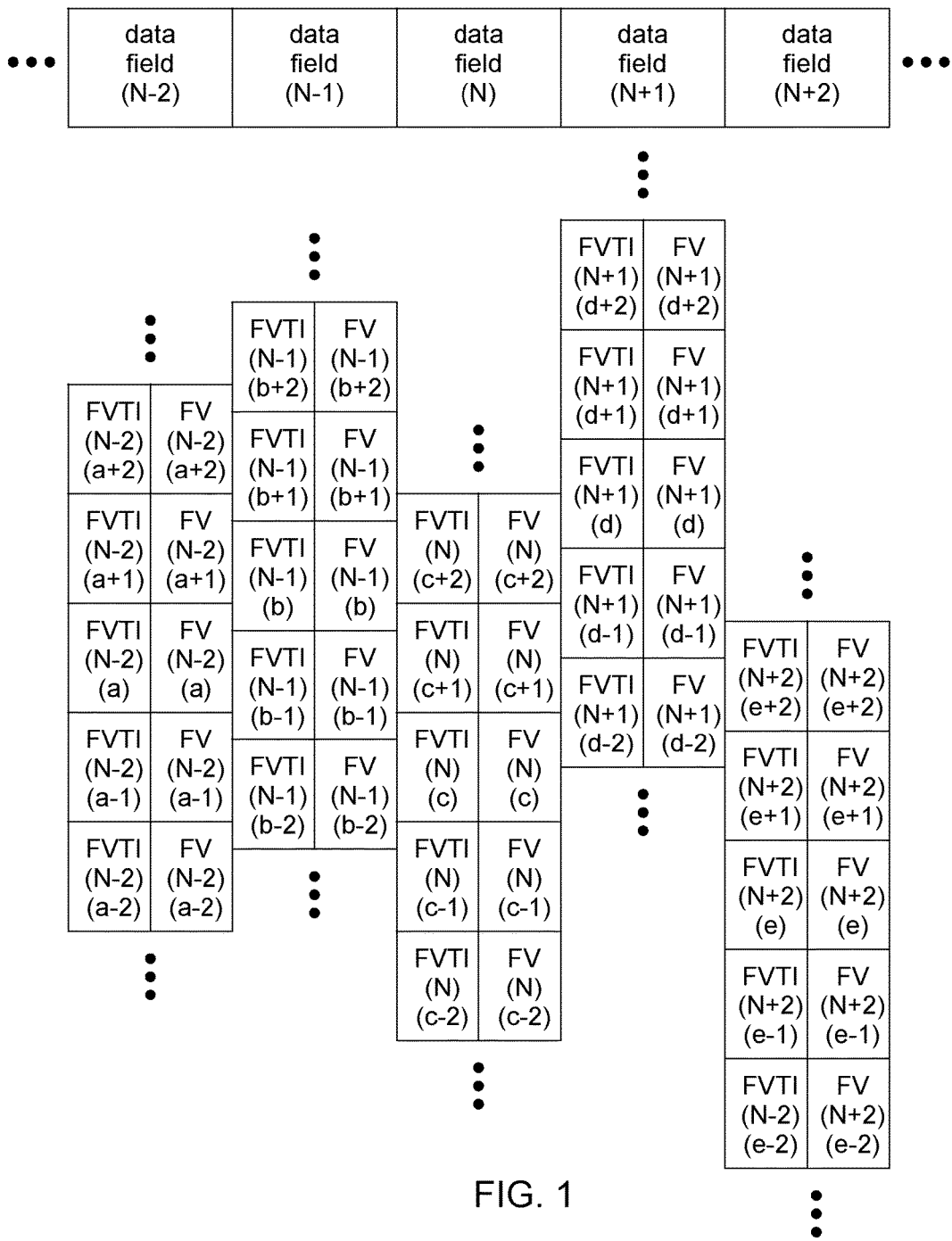
FIG. 1 illustrates schematically an example arrangement of a time-series dataset.
Figure 2:
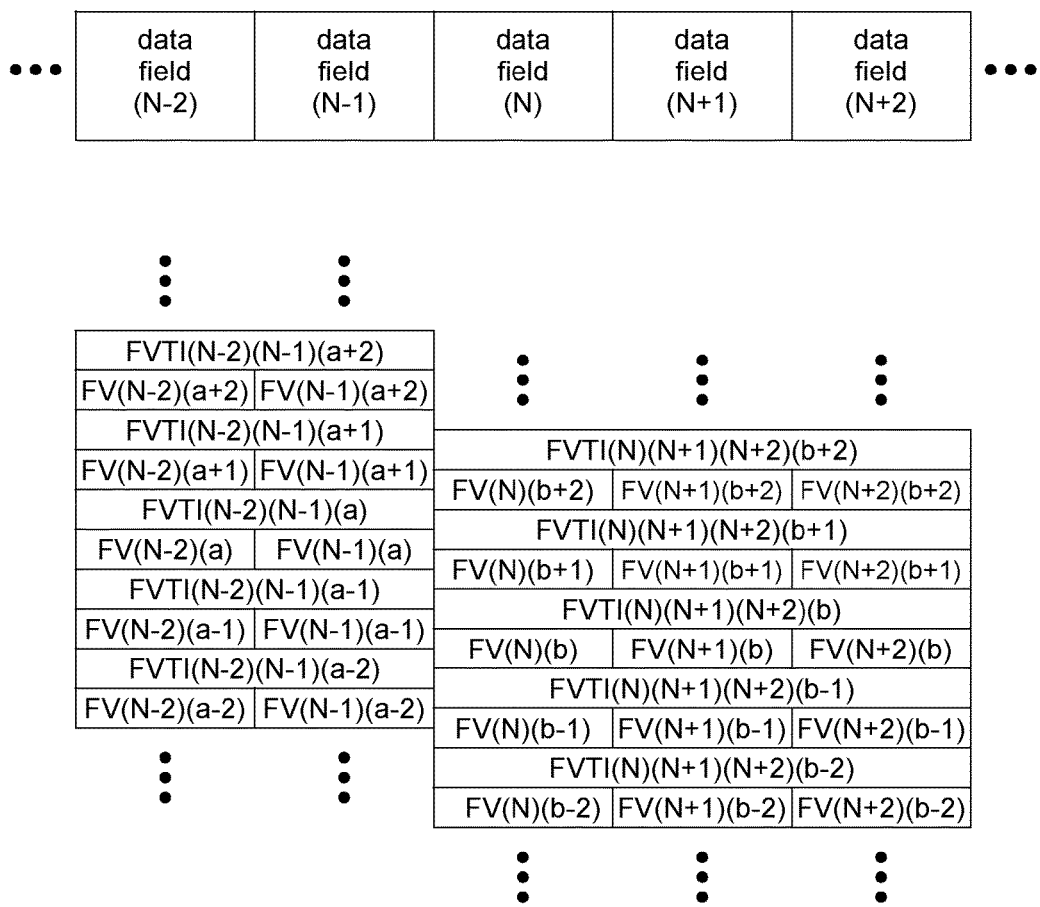
FIG. 2 illustrates schematically another example arrangement of a time-series dataset.

Examples of a time-series dataset are illustrated schematically in FIGS. 1 and 2. Such a time-series dataset includes one or more corresponding field-value (FV) data strings for each one of multiple defined data fields. The data fields are indexed by 1, 2, 3, . . . , N−2, N−1, N, N+1, N+2, . . . , and the corresponding field values are denoted by FV(n,i) (i.e., the ith field value for the nth data field). The time-series dataset also includes multiple field-value-time-index (FVTI) data strings. Each one of the FV strings is associated with a corresponding FVTI data string. In the example of FIG. 1, each FV data string has its own associated FVTI data string (labelled with the same indices). In the example of FIG. 2, multiple FV data strings are associated with a single FVTI data string. In datasets that include data fields which nearly always appear together (e.g., latitude and longitude of a vehicle at a given time), redundant storage of a common time index shared by multiple field values can be avoided.

Each FV data string represents, in any suitable format, alphanumeric or binary data or other data or information (image, sound, video, and so forth) that is generated, measured, recorded, acquired, or otherwise produced, often using a corresponding data acquisition device; the FVTI data string represents, in any suitable format, a time when the associated field value was generated, measured, recorded, acquired, or otherwise produced. Any desired fields can be included in the time-series dataset with their associated time-dependent field values and associated time indices. Myriad examples exist or can be contrived that fall within the scope of the present disclosure or appended claims, including those mentioned in the Background; just a few examples include: position (latitude, longitude, perhaps elevation or altitude), velocity, and various operating parameters or telemetry of multiple vehicles of a fleet (e.g., cars, trucks, buses, freight or passenger trains, aircraft, ships); temperature, wind velocity, humidity or dew point, barometric pressure, precipitation, air quality measurements, and location from a multitude of weather sensors; height, weight, blood pressure, heart rate, blood chemistry measurements or a multitude of human patients or test subjects; temperature, power consumption, data transmission or reception bandwidth, data storage, read/write operations, hardware or software diagnostic data for a multitude of networked computers; the list of examples is virtually endless. With the advent of the so-called Internet-of-things (IoT), wherein many everyday household, business, environmental, or industrial items or equipment are connected to and exchange information via the Internet, a figurative explosion of generated time-series data is expected, and those huge volumes of data must be managed so as to be usable.

A number of factors add difficulty to management of large volumes of time-series data. Typically, the field values will not always, or even typically, be generated at uniform intervals or at the same time among different generating devices (represented graphically in FIGS. 1 and 2 by the relative vertical offsets among the respective time-series for each data field). Transmission of data to a central computer system or server typically will not occur uniformly or regularly, or at the same times for different devices. Data will not always be received in the order it was produced (i.e., not necessarily received or stored in an order that corresponds to the order of the associated time indices). Assimilation of newly received data into a data structure preferably would occur while still enabling access to the dataset, and newly received data should be properly inserted so as to maintain the organization of the data even if received asynchronously or out of order.

To be usable, the time-series dataset must be accessible responsive to electronic queries of various sorts. The sheer size of the dataset and its complexity make searching or filtering the information contained in the time-series dataset both time- and computing-resource-intensive.

Novel methods for organizing, managing, updating, searching, and filtering large volumes of time-series data are disclosed and claimed herein. Those methods employ generation and use of so-called time-slice datasets to facilitate organization and querying of the time-series dataset. Multiple time-slice datasets are generated from the time-series dataset and are employed to guide subsequent manipulations or queries of the time-series dataset. As noted above, the time-series dataset includes one or more (and typically many) field-value (FV) data strings representing information acquired, measured, generated, or recorded at a time represented by an associated field-value-time-index (FVTI) data string. Electronic indicia of the time-series dataset (i.e., of the constituent FV and FVTI data strings representing the time-series dataset) can be stored, in any suitable format or arrangement, on one or more tangible, non-transitory computer-readable media of a computer system. Suitable arrangements of the time-series dataset can include one or more among simple alphanumeric text files, binary files, tables, spreadsheets, relational or non-relational databases, specialized or purpose-built binary or alphanumeric storage formats, and so on. The methods disclosed and claimed herein can be implemented with datasets stored in any of those suitable formats or arrangements or in future-developed formats or arrangements.

Note that references to (i) information in the dataset, (ii) corresponding data strings representing that information, and (iii) corresponding electronic indicia of those data strings are made somewhat interchangeably in the present disclosure and appended claims. Typically it is clear from a given context which of those is meant even if a different one of them is recited, and any reference to one of those in the present disclosure shall be construed as denoting the one appropriate for the given context unless explicitly stated otherwise. For example, "updating" or "replacing" a time-index data string would be understood as referring to updating or replacing the stored electronic indicia of that time-index data string. Similarly, note that references to (i) a time when an event occurred, (ii) a corresponding time-index representing that time, (iii) a corresponding time-index data string representing that time index, and (iv) corresponding electronic indicia of that time-index data string are made somewhat interchangeably in the present disclosure and appended claims. Any reference to one of those in the present disclosure shall be construed as denoting the one appropriate for the given context unless explicitly stated otherwise. For example, a first time-index data string being identified as being "later" than a second time-index data string would be understood to mean that a first time represented by a corresponding first time index represented by the first time-index data string is later than a second time represented by a corresponding second time index represented by the second time-index data string.

Figure 3A:
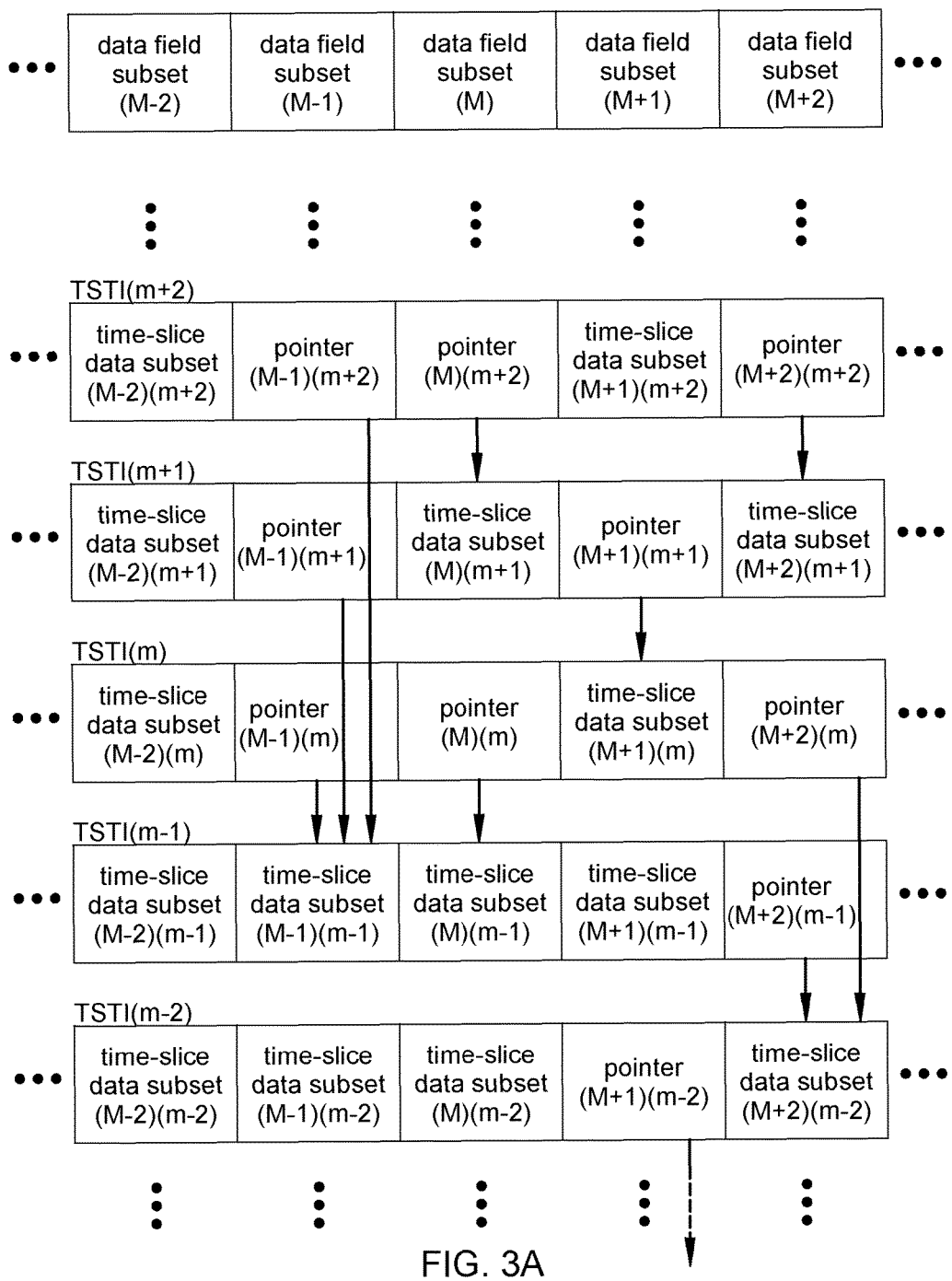
FIGS. 3A and 3B illustrate schematically two example arrangements of a set of multiple time-slice datasets.
Figure 3B:
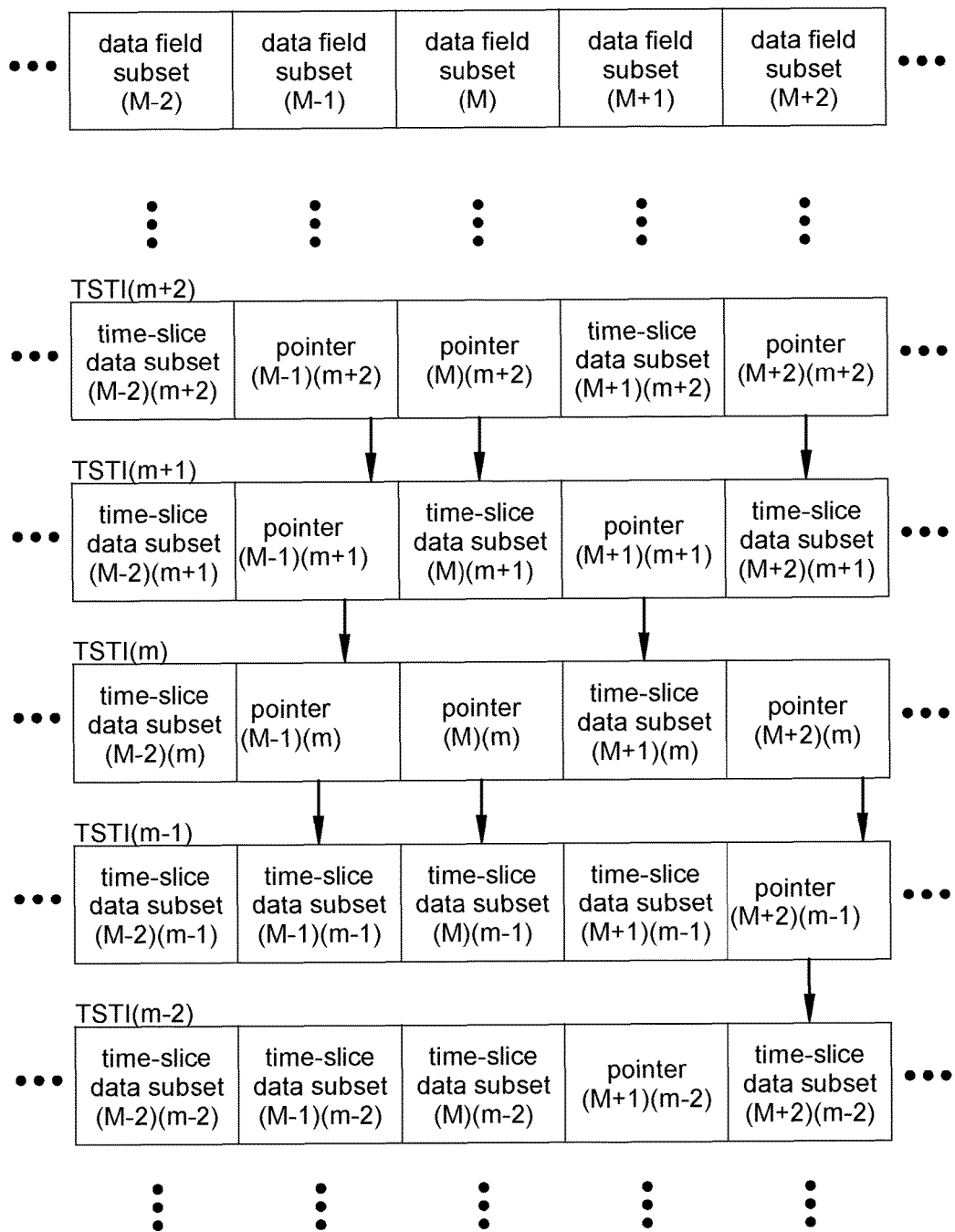

An example of a set of multiple time-slice datasets is illustrated schematically in FIGS. 3A and 3B. Data fields of the time-series dataset are assigned to one or more designated data field subsets, e.g., subsets 1, 2, 3, . . . , M−2, M−1, M, M+1, M+2, . . . as shown in FIGS. 3A and 3B. Any suitable or desirable assignment of specific data fields into corresponding subsets can be employed, and a specific scheme of those assignments typically is influenced by the nature of the underlying time-series dataset and the types of queries that are desired for searching or filtering the dataset. In an example of a fleet time-series dataset for a trucking company, data fields could be grouped into subsets according to one or more of geographic position, shipment contents, shipment owner, or shipment origin or destination. In some instances certain data fields can be omitted from the designated subsets; in some examples one or more data fields might be assigned to multiple subsets (i.e., the data field subsets are not necessarily disjoint). Again, such variants typically are driven by the type of dataset and the types of queries needed or desired.

Figure 4:
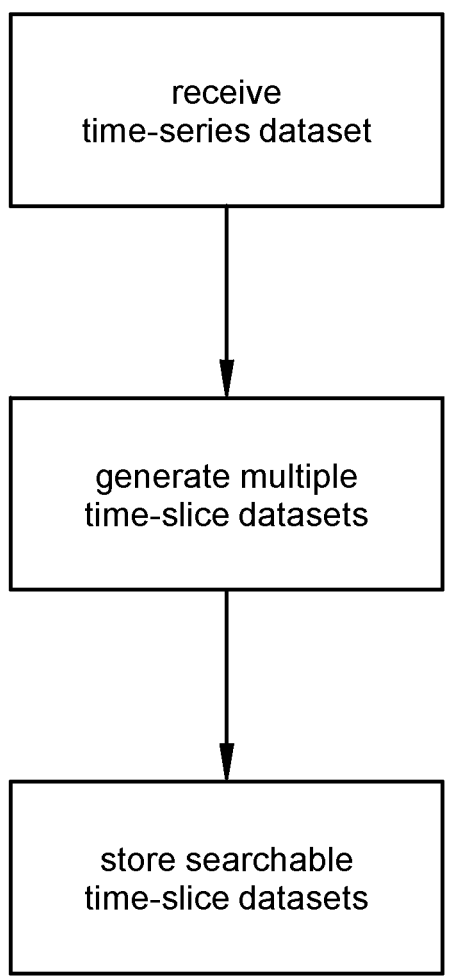
FIG. 4 illustrates schematically a method for generating and storing multiple time-slice datasets.

After receiving electronic indicia of the time-series dataset at a computer system, one or more processors of the computer system are used to automatically generate, from the received indicia, electronic indicia of multiple time-slice datasets (FIG. 4). The electronic indicia of the entire time-series dataset might be received all at once (i.e., the complete-at-the-time time-series dataset is received at the computer system) or, more commonly, the electronic indicia are received piecemeal as new FV and FVTI data strings are received (piecemeal from the beginning or only after receiving an earlier complete-at-the-time time-series dataset). Each one of the multiple time-slice datasets corresponds to a designated time-slice time index (TSTI) that differs from the corresponding TSTI of at least one other of the multiple time-slice datasets. The time-slice datasets are indexed by TSTI(1), TSTI(2), . . . , TSTI(m−2), TSTI(m−1), TSTI(m), TSTI(m+1), TSTI(m+2), . . . as shown in FIGS. 3A and 3B. Each time-slice dataset is divided into time-slice data subsets that correspond to the designated subsets of the data fields, and are labelled by the indices (M, m), i.e., the time-slice data subset of the time-slice with TSTI(M) that includes or indicates FV and FVTI data strings for the mth subset of data fields. Note that a time-slice dataset or time-slice data subsets described as "having" a TSTI means that the dataset or data subset corresponds to that TSTI, but does not necessarily literally include a data string or indicia representing the TSTI. Once generated, the electronic indicia of the multiple time-slice datasets are stored automatically in a computer-searchable format on one or more tangible, non-transitory computer-readable media of the computer system that are operatively coupled to one or more electronic processors of the computer system. One advantage of the methods disclosed herein is the ability to store different time-slice datasets on different computer-readable media, in some cases coupled to different computers or processors of a computer system. That capability can be especially advantageous when employed for very large time-series datasets.

Each time-slice data subset includes or indicates FV and FVTI data strings for each data field of the corresponding designated subset of the multiple data fields. For each data field of the subset, the time-slice subset includes either a corresponding single FV data string from the time-series dataset, or a pointer indicating a corresponding FV data string in an earlier corresponding time-slice data subset (i.e., a time-slice data subset from a time-slice dataset with an earlier TSTI). Similarly, for each data field of the subset, the time-slice subset includes either the FVTI data string from the time-series dataset that is associated with the included or indicated FV data string, or a pointer indicating the associated FVTI data string in an earlier corresponding time-slice data subset.

If an earlier FV or FVTI data string (i.e., an FV or FVTI data string in a time-slice subset having an earlier TSTI) is indicated using a pointer, a single pointer can directly indicate the earlier data string (as in FIG. 3A), or the earlier data string can be indicated by a series of multiple pointers (as in FIG. 3B, in which each pointer indicates a data string or another pointer in only the next-earlier time-slice data subset; other series of pointers can include one or more pointers that "skip" one or more intervening time-slice data subsets). The term "indicated by a pointer" shall encompass any suitable arrangement of one direct pointer or a series of multiple pointers. Any of those different pointer arrangements can occur in any desired combination within the set of multiple time-slice datasets.

In addition, the examples of FIGS. 3A and 3B show only a single pointer to/from each time-slice subset, i.e., each time-slice data subset either includes a single pointer indicating an entire earlier time-slice data subset, or includes only data strings and no pointer. That is a useful arrangement in some instances, however, other useful arrangements can be employed wherein a single time-slice data subset can include both data strings and pointers. If multiple pointers are included, they need not all indicate data strings in the same earlier time-slice data subset. A single pointer can be employed to indicate sets of one or more earlier data strings, grouped in any suitable or desirable way. For a given data field, it might be the case that a given time-slice data subsets includes both of the corresponding FV and FVTI data strings, pointers indicating both in earlier time-slice data subsets (not necessarily the same one), or a data string for one and a pointer for the other. Which of myriad combinations of such arrangements are employed can be selected based on the underlying relationships that exist among the data fields or on the types of search or filter queries that are contemplated.

Whether a given time-slice data subset includes, for a given data field, one or more data strings, one or more pointers, or one or more of each for corresponding FV data string and associated FVTI data string, each FVTI data string included in, or indicated by a pointer of, each time-slice data subset represents a latest FVTI in the time-series dataset, for the associated FV data string, that is earlier than the TSTI of that time-slice data subset. In other words, each time-slice data subset (and therefore the entire time-slice dataset of which they are a part) includes or indicates the latest field values present in the time-series dataset that are earlier than the time index of that time-slice dataset. It is that property of the time-slice datasets that provides much of the utility of the disclosed methods.

Any suitable number or distribution of TSTIs among the time-slice datasets can be employed. The TSTIs can be regularly spaced or irregularly spaced (in time), which will often depend on the specific nature of the underlying time-series dataset, incorporation of new data into the time-series dataset, or the types of queries of that dataset that are contemplated. The "time-density" of the TSTIs relative to the time-density of data strings in the time-series dataset (i.e., how many data strings typically appear between succeeding TSTIs among that time-slice datasets) can attain any suitable value. Fewer time-slice datasets with more widely spaced TSTIs will have a larger number of intervening data strings; this results in less storage space occupied by the time-slice datasets, but will decrease the speed advantage gained by using the time-slice datasets in queries of the time-series dataset (described further below). Conversely, a larger number of time-slice datasets with less widely spaced TSTIs will have a smaller number of intervening data strings; this results in more storage space occupied by the time-slice datasets, but will increase the speed advantage gained by using the time-slice datasets in queries of the time-series. Typically, but not always, it is desirable that the total storage space required for all of the multiple time-slice datasets be substantially less than the total storage space required by the time-series dataset.

Many queries of a time-series database include "as of time X" as one criterion, i.e., whatever other criteria or limitations are placed on a search or filter command, the results are desired for the data field values extant at some time X. Queries over a range of times typically would still incorporate one or more "as-of-time-X"-type queries. A primary purpose of providing a time-series dataset is to enable just that type of searching or filtering. Searching or filtering the entire time-series dataset to determine the latest field values earlier than time X is inefficient and time-consuming. The time-slice datasets are employed in the disclosed methods to limit the required searching or filtering of the time-series dataset to only a range of times between successive TSTIs of the time-slices. Typically, only those field values need to be interrogated (i.e., evaluated for conformance, or not, with one or more search or filter criteria) that are associated FVTIs that are (i) earlier than the time X and (ii) later than the latest TSTI that is earlier than X (i.e., the "next-earlier" TSTI); often the contents of later time-slice datasets can be employed to limit or eliminate the need for even that limited interrogation of the time-series dataset. Reducing the need to directly access and interrogate the time-series dataset (which is quite large), and instead accessing or interrogating one or a few of the time-slice datasets (which are substantially smaller), can enable substantial speed gains.

Note that when a data string from the time-series dataset is referred to as being "included" in a time-slice data subset, it is the information represented by that data string that is the same; those strings might differ with respect to specific data string representation or electronic indicia. For example, a distance might be expressed as miles in the time-series dataset but as kilometers in a corresponding time-slice data subset, might be represented by an alphanumeric string in the time-series dataset but by a binary string in the time-slice data subset, or as an integer with scale factor in the time-series dataset but as a real number in the time-slice data subset. Despite such differences, the distance field value from the time-series dataset would still be considered to be "included" in the time-slice data subset.

A convention for consistent treatment of FVTIs that are the same as a TSTI can reduce or eliminate ambiguity that might otherwise arise when using the disclosed methods. Those FVTIs can be treated as being either earlier than or later than the same TSTI; consistent treatment of such TSTIs removes potential ambiguity that could in turn lead to unsatisfactory results of the disclosed methods. In some examples, any FVTI that indicates a time that is the same as a time indicated by a specified TSTI is included among FVTIs that are treated as being earlier than the specified TSTI; in other examples, any FVTI that indicates a time that is the same as a time indicated by a specified TSTI is included among FVTIs that are treated as being later than the specified TSTI. Given the typical queries expected, the former convention might be a more natural choice, but either convention can be implemented with satisfactory outcomes.

It can be advantageous to include among the time-slice datasets an earliest time-slice dataset, i.e., a so-called "beginning-of-time" time-slice dataset. That earliest time-slice dataset corresponds to a TSTI that is earlier than every other TSTI among the time-slice datasets and earlier than every FVTI of the time-series dataset. Every time-slice data subset of the earliest time-slice dataset includes one or more strings and no pointers. The earliest time-slice dataset can be useful when generating, querying, or otherwise manipulating the time-slice datasets, by providing every later time-slice dataset with an earlier data string to indicate with a pointer, if needed to avoid errors or inconsistencies in the programming.

Likewise, It can be advantageous to include among the time-slice datasets a latest time-slice dataset, i.e., a so-called "end-of-time" or "present-time" time-slice dataset. That latest time-slice dataset corresponds to a TSTI that is later than every other TSTI among the time-slice datasets and later than every FVTI of the time-series dataset. The latest TSTI often will correspond to the present time. Every time-slice data subset of the latest time-slice dataset includes one or more pointers and no data strings. The latest time-slice dataset can be useful when generating, querying, or otherwise manipulating the time-slice datasets, by providing in some instances an indication of the contents of earlier time-slice datasets and thereby obviating in those instances a need to query an earlier time-slice data subset or the time-series dataset.

Figure 7:
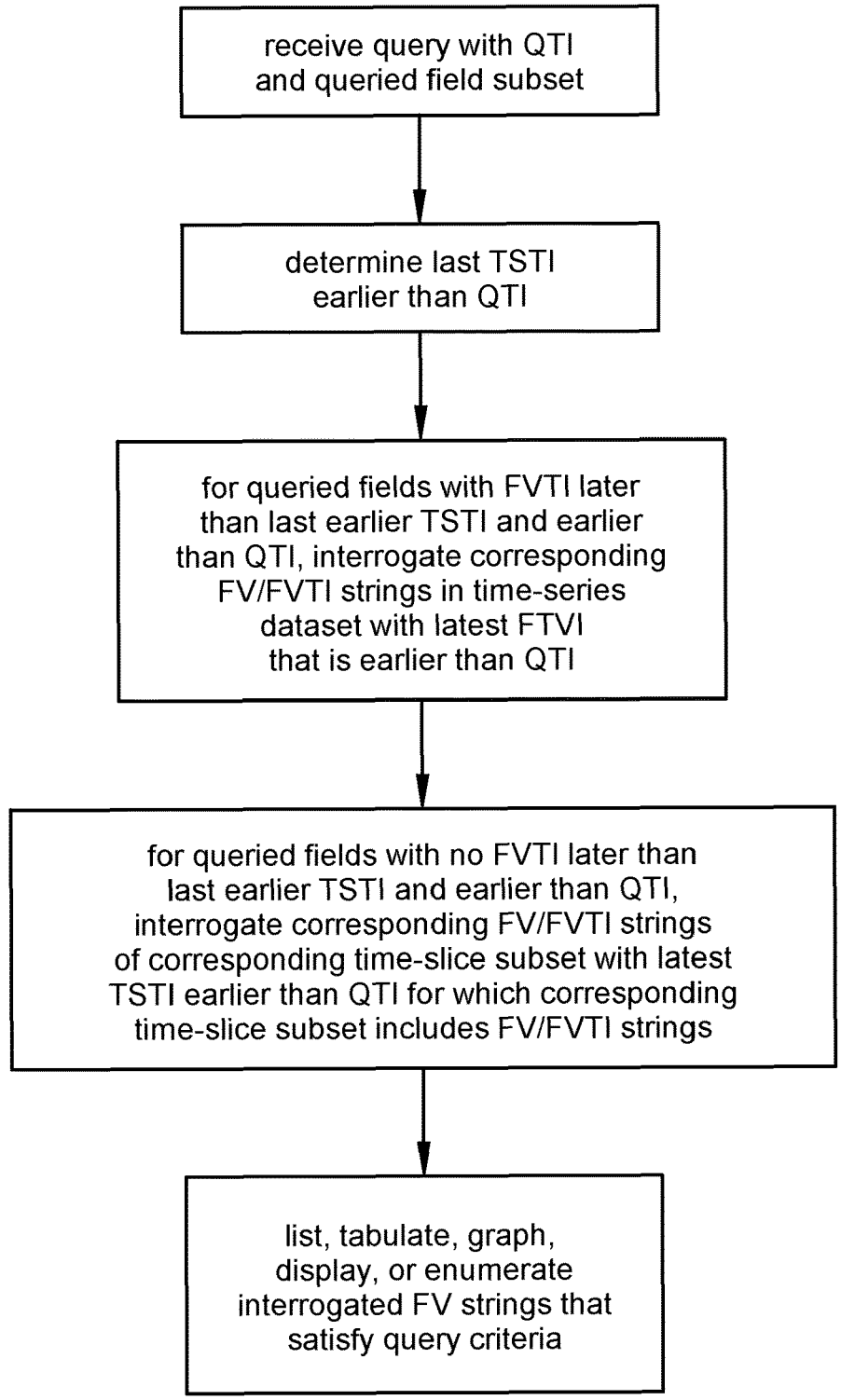
FIG. 7 illustrates schematically querying the time-series dataset using the multiple time-slice datasets.

A computer-implemented method can be employed for searching or filtering a time-series dataset for which multiple time-slice datasets have been generated (illustrative example shown in FIG. 7). An electronic query is received at the computer system for a list, tabulation, graph, display, or enumeration of FV data strings, of a queried subset of the multiple data fields specified in the query, having latest associated FVTI data strings earlier than a query time index (QTI; i.e., the "time X" referred to above). In one illustrative example, a time-series dataset for a multitude of drone aircraft operating across a geographic area includes data fields for latitude, longitude, altitude, inflight/grounded status, charging/discharging status, and percent charge on the battery, and those are recorded roughly every five minutes and reported as soon as is practicable for inclusion in the time-series dataset. However, due to irregular or interrupted recording or reporting, there can be significant gaps in the time-series dataset. Time slice datasets can be generated with TSTIs generated every hour on the hour; time-slice subsets can be defined based on specific groups of drones, or even single drones, within the multitude. A query of that time-series dataset might be to identify all drones that are in flight with less than 30% charge between 35° and 40° north latitude and between 100° and 105° west longitude as of 10:30 AM 9 Feb. 2016. The queried data fields in this example are latitude, longitude, percent charge, and inflight/grounded status for each drone; the QTI is 10:30 AM 9 Feb. 2016.

After receiving the query, a corresponding latest FVTI data string is automatically identified, for each field of the queried subset, that is earlier than the QTI. In the example, the latest corresponding FVTI occurring in the time-series dataset that is earlier than 10:30 AM 9 Feb. 2016 is determined for each of the latitude, longitude, percent charge, and inflight/grounded status data fields for each drone. The FV data strings associated with each of the FVTIs thus identified are then automatically interrogated to determine whether they meet the search or filter criteria. In the example, interrogated fields indicating inflight with less than 30% charge between 35° and 40° north latitude and between 100° and 105° west longitude satisfy the criteria included in the query. Finally, those interrogated FV data strings or associated FVTI data strings that satisfy the search or filter criteria are listed, tabulated, graphed, displayed (e.g., on a map), or enumerated. In the example, the positions of the drones that meet the filter criteria can be plotted on a map.

Identifying, for each queried data field, the latest FVTI data string in the time-series dataset that is earlier than the QTI can be accomplished by automatically electronically querying the electronic indicia of the time-series dataset itself. However, that direct query can be limited in scope (and time and computing resources) by employing the time-slice datasets. First, a latest TSTI among the time-slice datasets is determined that is earlier than the QTI, i.e., the next-earlier TSTI is identified. In the example, the QTI is 10:30 AM 9 Feb. 2016, so the next-earlier TSTI is 10 AM 9 Feb. 2016. For each one of the queried fields, the time-series dataset need only be queried to determine that there is no associated FVTI that is later than the next-earlier TSTI and earlier than the QTI. For each queried field for which that condition is met, the latest FVTI (earlier than the QTI) in the time-series dataset is the FVTI included in, or indicated by a pointer of, the corresponding next-earlier time-slice data subset. In the example, for each queried field, if no FVTI is identified that is later than 10 AM 9 Feb. 2016 and earlier than 10:30 AM 9 Feb. 2016, then the FV and FVTI data strings included in, or indicated by a pointer of, the time-slice data subset with the TSTI of 10 AM 9 Feb. 2016 are interrogated as the latest available values for those fields earlier than 10:30 AM 9 Feb. 2016 (i.e., earlier than the QTI).

Direct access to and interrogation of the time-series dataset can be further limited by using one or more time-slice datasets with corresponding TSTIs later than the QTI. An earliest TSTI among the time-slice datasets is automatically determined that is later than the QTI, i.e., the next-later TSTI is identified. For each queried data field, if the corresponding time-slice data subset with the next-later TSTI includes a pointer for the corresponding FVTI, then there is certainly no FVTI in the time-series dataset for that field that is later than the next-earlier TSTI, and the time-series dataset need not be queried at all. Instead, the corresponding FVTI data string indicated by the pointer with the next-later TSTI is identified as the latest FVTI data string for that field, and the corresponding FV and FVTI data strings are interrogated. In the example, if a pointer is found in the 11 AM 9 Feb. 2016 time slice (next-latest TSTI) for the position of a drone, then the field values indicated by that pointer (in some earlier time-slice data subset) can be interrogated as the most recent value as of 10:30 AM 9 Feb. 2016 (the QTI), without ever accessing or interrogating the time-series dataset itself.

Direct access to and interrogation of the time-series dataset can be further limited, for a given queried data field, if any later time-slice dataset includes, or indicates with a pointer, an FVTI earlier than the QTI. For any field for which such an FVTI exists (earlier than the QTI in a time-slice later than the QTI), there can be no FVTI later than that that is also earlier than the QTI, and the time-series dataset need not be queried at all. Instead, the corresponding FVTI data string indicated by the pointer with the next-later TSTI is identified as the latest FVTI data string for that field, and the corresponding FV and FVTI data strings are interrogated. In the example, if a pointer is found in the 11 AM 9 Feb. 2016 time slice (next-latest TSTI) for the position of a drone reported at 10:15 AM 9 Feb. 2016 (before QTI), then the field values indicated by that pointer can be interrogated as the most recent value as of 10:30 AM 9 Feb. 2016 (the QTI), without ever accessing or interrogating the time-series dataset itself. While an FVTI earlier than the QTI that is found in any later time-slice dataset can yield this result, typically the next-later time-slice dataset would be employed.

As noted earlier for FVTIs and TSTIs that indicate the same time, a convention for consistent treatment for QTIs that are the same as TSTIs or FVTIs can reduce or eliminate ambiguity that might otherwise arise when using the disclosed methods. Those QTIs can be treated as being either earlier than or later than the same TSTI or FVTI; consistent treatment of such QTIs removes potential ambiguity that could in turn lead to unsatisfactory results of the disclosed methods. In a first set of examples, any FVTI that indicates a time that is the same as a time indicated by the QTI is included among FVTIs that are treated as being earlier than the QTI, and any TSTI that indicates a time that is the same as a time indicated by the QTI is included among TSTIs that are treated as being earlier than the QTI. In a second set of examples, any FVTI that indicates a time that is the same as a time indicated by the QTI is included among FVTIs that are treated as being later than the QTI, and any TSTI that indicates a time that is the same as a time indicated by the QTI is included among TSTIs that are treated as being later than the QTI. In a third set of examples, any FVTI that indicates a time that is the same as a time indicated by the QTI is included among FVTIs that are treated as being earlier than the QTI, and any TSTI that indicates a time that is the same as a time indicated by the QTI is included among QTIs that are later than the TSTI. In a fourth example, any FVTI that indicates a time that is the same as a time indicated by the QTI is included among FVTIs that are later than the QTI, and any TSTI that indicates a time that is the same as a time indicated by the QTI is included among TSTIs that are earlier than the TSTI. Given the typical queries expected, the first convention might be a more natural choice, but any one of the four conventions can be implemented with satisfactory outcomes.

Figure 5:
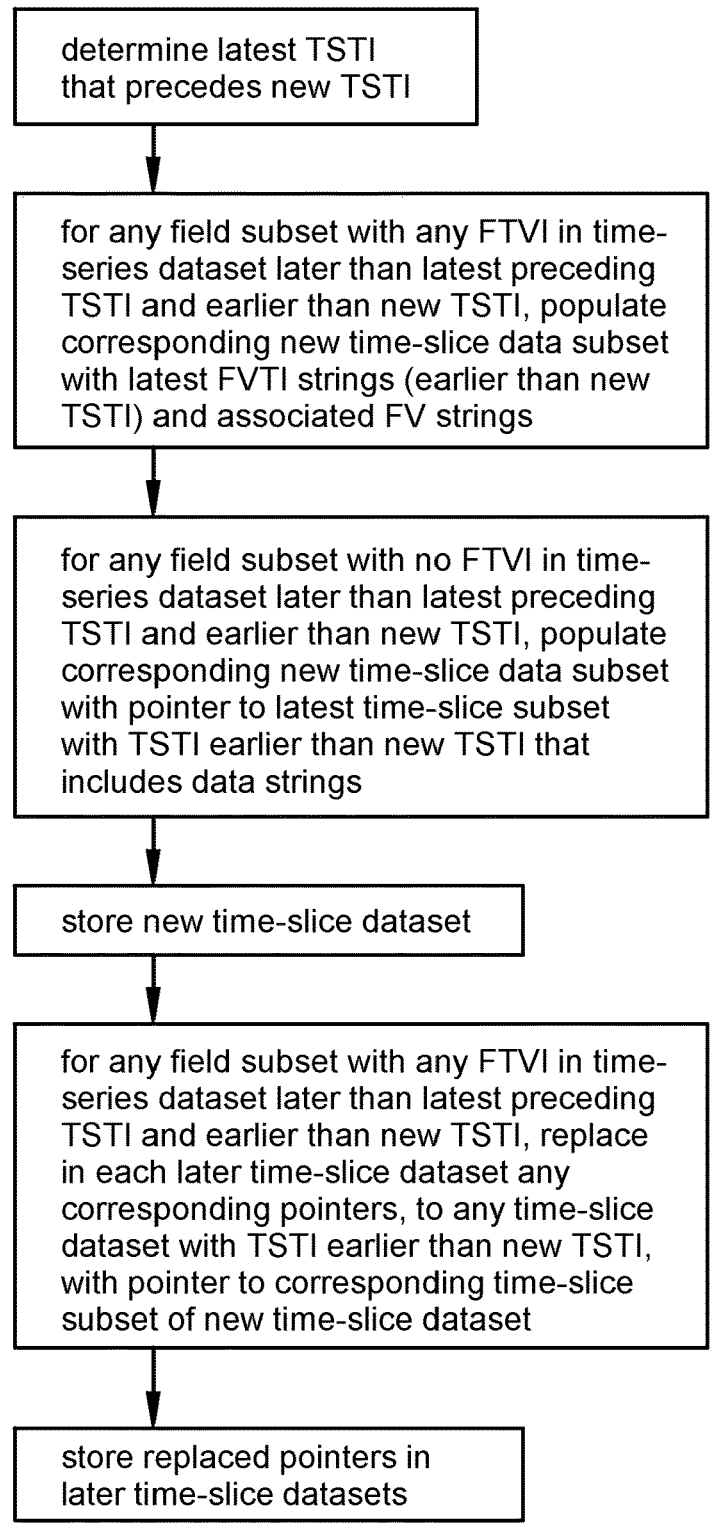
FIG. 5 illustrates schematically a method for inserting an additional time-slice dataset and updating later time-slice datasets.

It may be desirable in certain circumstances to generate one or more additional time-slice datasets (illustrative example shown in FIG. 5). One common scenario would be generation of new, later time-slice datasets as time passes and new time-series data is generated, with each new corresponding TSTI later than all others (except perhaps an "end-of-time' slice as described earlier, if employed). In the drone example, a new time-slice dataset is generated every hour on the hour that is later than the existing time-slice datasets. More generally, a new time-slice might be inserted with a corresponding new TSTI between two other extant TSTIs among the time-slice datasets. In the drone example, it might be decided that TSTIs every hour are not sufficiently frequent, that every half-hour would be more suitable, and that new time-slice datasets should be generated.

There are some commonalities between methods to generate a new TSTI and the queries described above. To generate a new time-slice dataset, a corresponding new TSTI must be designated. Subsequent actions for generating the new time-slice dataset are quite analogous to those described above for a query, with the new TSTI taking the place of the QTI. For each field included in the time-slice dataset, the latest associated FVTI in the time-series database that is earlier than the new TSTI must be identified, the corresponding FV and FVTI data strings included in, or indicated by a pointer of, a time-slice subsets of the new time-slice dataset. The existing TSTIs and time-slice datasets, particularly the next-earlier and next-later (relative to the new TSTI) can be employed to reduce or eliminate accessing the time-series dataset itself to populate the new time-slice dataset. Unlike the queries described above, the new time-slice dataset can include one or more (or many) pointers to earlier time-slice datasets. Also unlike the queries described above, all fields included in the time-slice datasets must be identified, not just a queried subset of those fields. In short, generating a new time-slice dataset is analogous to performing a query of all data fields at the new TSTI and including or pointing to all the identified FV and FVTI strings in the new time-slice dataset.

After designating a new TSTI, a corresponding latest FVTI data string is automatically identified, for each field of the time-slice datasets, that is earlier than the new designated TSTI. In the drone example, assume a new designated TSTI of 2:30 PM 3 Jan. 2016. Then the latest corresponding FVTI occurring in the time-series dataset that is earlier than 2:30 PM 3 Jan. 2016 is determined for each of the latitude, longitude, percent charge, and inflight/grounded status data fields for each drone. The FV data strings associated with each of the FVTIs thus identified are then automatically included in, or indicated by pointers of, the new time-slice dataset (and corresponding data subsets thereof) with the new designated TSTI.

Identifying, for each data field, the latest FVTI data string in the time-series dataset that is earlier than the new designated TSTI can be accomplished by automatically electronically querying the electronic indicia of the time-series dataset itself. However, that direct query can be limited in scope (and time and computing resources) by employing the extant time-slice datasets. First, a latest TSTI among the time-slice datasets is determined that is earlier than the new designated TSTI, i.e., the next-earlier TSTI is identified. In the drone example, if the new designated TSTI is 2:30 PM 3 Jan. 2016, then the next-earlier TSTI is 2 PM 3 Jan. 2016. For each one of the data fields, the time-series dataset need only be queried to determine that there is no associated FVTI that is later than the next-earlier TSTI and earlier than the new TSTI. For each queried field for which that condition is met, the latest FVTI (earlier than the new designated TSTI) in the time-series dataset is the FVTI included in, or indicated by a pointer of, the corresponding next-earlier time-slice data subset, and the corresponding FV and FVTI data strings are included in, or indicated by a pointer of, the new time-slice dataset. In the drone example, for each field, if no FVTI is identified that is later than 2 PM on 3 Jan. 2016 and earlier than 2:30 PM 3 Jan. 2016, then the FV and FVTI data strings included in, or indicated by a pointer of, the time-slice data subset with the TSTI of 2 PM 3 Jan. 2016 are also included in, or indicated by a pointer of, the new time-slice data subset with the new TSTI of 2:30 PM 3 Jan. 2016.

Direct access to and interrogation of the time-series dataset can be further limited by using one or more time-slice datasets with corresponding TSTIs later than the new designated TSTI. An earliest TSTI among the time-slice datasets is automatically determined that is later than the new designated TSTI, i.e., the next-later TSTI is identified. For each data field, if the corresponding time-slice data subset with the next-later TSTI includes a pointer for the corresponding FVTI, then there is certainly no FVTI in the time-series dataset for that field that is later than the next-earlier TSTI, and the time-series dataset need not be queried at all. Instead, the corresponding FVTI data string indicated by the pointer with the next-later TSTI is identified as the latest FVTI data string for that field, and the corresponding FV and FVTI data strings are included in, or indicated by a pointer of, the new time-slice data subset with the new designated TSTI. In the drone example, if a pointer is found in the 3 PM 3 Jan. 2016 time slice (next-latest TSTI) for the position of a drone, then the field values indicated by that pointer (in some earlier time-slice data subset) can be included in, or indicated by a pointer of, the new time-slice data subset as the most recent field values as of 2:30 PM 3 Jan. 2016 (the new designated TSTI), without ever accessing or interrogating the time-series dataset itself.

Direct access to and interrogation of the time-series dataset can be further limited, for a given queried data field, if any later time-slice dataset includes, or indicates with a pointer, an FVTI earlier than the new designated TSTI. For any field for which such an FVTI exists (earlier than the new designated TSTI in a time-slice later than the new designated TSTI), there can be no FVTI later than that that is also earlier than the new designated TSTI, and the time-series dataset need not be queried at all. Instead, the corresponding FVTI data string indicated by the pointer with the next-later TSTI is identified as the latest FVTI data string for that field, and the corresponding FV and FVTI data strings are included in, or indicated by a pointer of, the new time-slice data subset. In the example, if a pointer is found in the 3 PM 3 Jan. 2016 time slice (next-latest TSTI) for the position of a drone reported at 2:15 PM 3 Jan. 2016 (before the new designated TSTI), then the field values indicated by that pointer can be included in, or indicated by a pointer of, the new time-slice data subset as the most recent value as of 2:30 PM 3 Jan. 2016 (the new designated TSTI), without ever accessing or interrogating the time-series dataset itself. While an FVTI earlier than the new designated TSTI that is found in any later time-slice dataset can yield this result, typically the next-later time-slice dataset would be employed.

In some examples, if any FV or FVTI data string is included in a given time-slice data subset of the new time-slice dataset, then all fields of that data subset are populated with FV and FVTI data strings; in such examples, a single pointer can be included in one time-slice data subset to indicate an entire earlier corresponding time-slice data subset. In other examples, a given time-slice data subset can include a mixture of data strings and pointers. The choice between those arrangements is often suggested by the nature of or connections or correlations among the various data fields of the time-series dataset.

After an new time-slice dataset is generated, it may be necessary or desirable to update one or more pointers of one or more later time-slice datasets. For several of the sequences described above, properly updated pointers in later time-slice datasets are necessary if those datasets are to be employed in the disclosed query methods and time-slice insertion methods. In certain instances it is preferable that later time-slice datasets not be updated (see below).

Assuming that one or more previously extant later time-slice datasets are to be updated after a new time-slice dataset is generated, only pointers for certain data fields need to be updated. Generally, any pointer of a later time-slice dataset that indicates a time-slice dataset earlier than the new time-slice dataset could be replaced with a new pointer that indicated the corresponding data string or pointer of the new time slice. More specifically, such pointers typically should be replaced in later time-slice data subsets that include at least one field for which a latest FVTI before the new TSTI was found that is also later than the first-earlier TSTI. It should be noted that "replacing" a pointer to an earlier data string or pointer with a new pointer to a later data string or pointer can be accomplished by replacing a single pointer or a first pointer of a sequence with a single, direct new pointer, or by replacing one or more or all of the pointers of a sequence.

It should be noted that, if for some reason a time-slice dataset is to be removed, if any later time-slice datasets include pointers to any data strings or pointers of the deleted time-slice dataset, those pointers must be replaced or updated. Typically, updating such pointers to indicate the corresponding data string or pointer in the latest remaining time-slice dataset earlier than the deleted one will adequately address the issue. Other schemes could be devised and implemented.

In some situations it might be known that a large number of different queries are to be performed with the same QTI, or within a designated range of QTIs. In those situations it can be advantageous to generate one or more additional time-slice datasets, with corresponding new TSTI(s) near or equal to the QTI(s), and then to perform all querying or interrogation of data strings within the one or more additional time-slice datasets. Significant speed enhancements can be realized using such a technique, because much of the time index testing required in the various query methods described above are no longer necessary; the only such time index testing would occur during generation of the new time-slice datasets. It may not always be necessary to generate an entire time-slice for this purpose; in some instances further time or space savings can be realized if only portions of the time-slice dataset are generated, i.e., only those portions that include data fields or pointers to be queried. In those instances, it may be unnecessary, and even undesirable, to alter extant time-slice datasets after generating the new ones. In some instances the additional one or more time-slice datasets are deleted, uncoupled from the extant previously extant time-slice subsets, or otherwise deactivated, in which case leaving the previously extant time-slice datasets unaltered would be preferred.

The problem of intermittent or delayed transmission of data as mentioned earlier. It is not unusual for FV data strings with later associated FVTI data strings to be present in the time-series dataset and multiple time-slice datasets before reception of FV data strings with earlier associated FVTI data strings. In particular, although insertion of the newly arrived data strings into the time-series dataset poses no particular problem, the effect of the newly arrived data strings can introduce errors into the later time-slice datasets.

Figure 6:
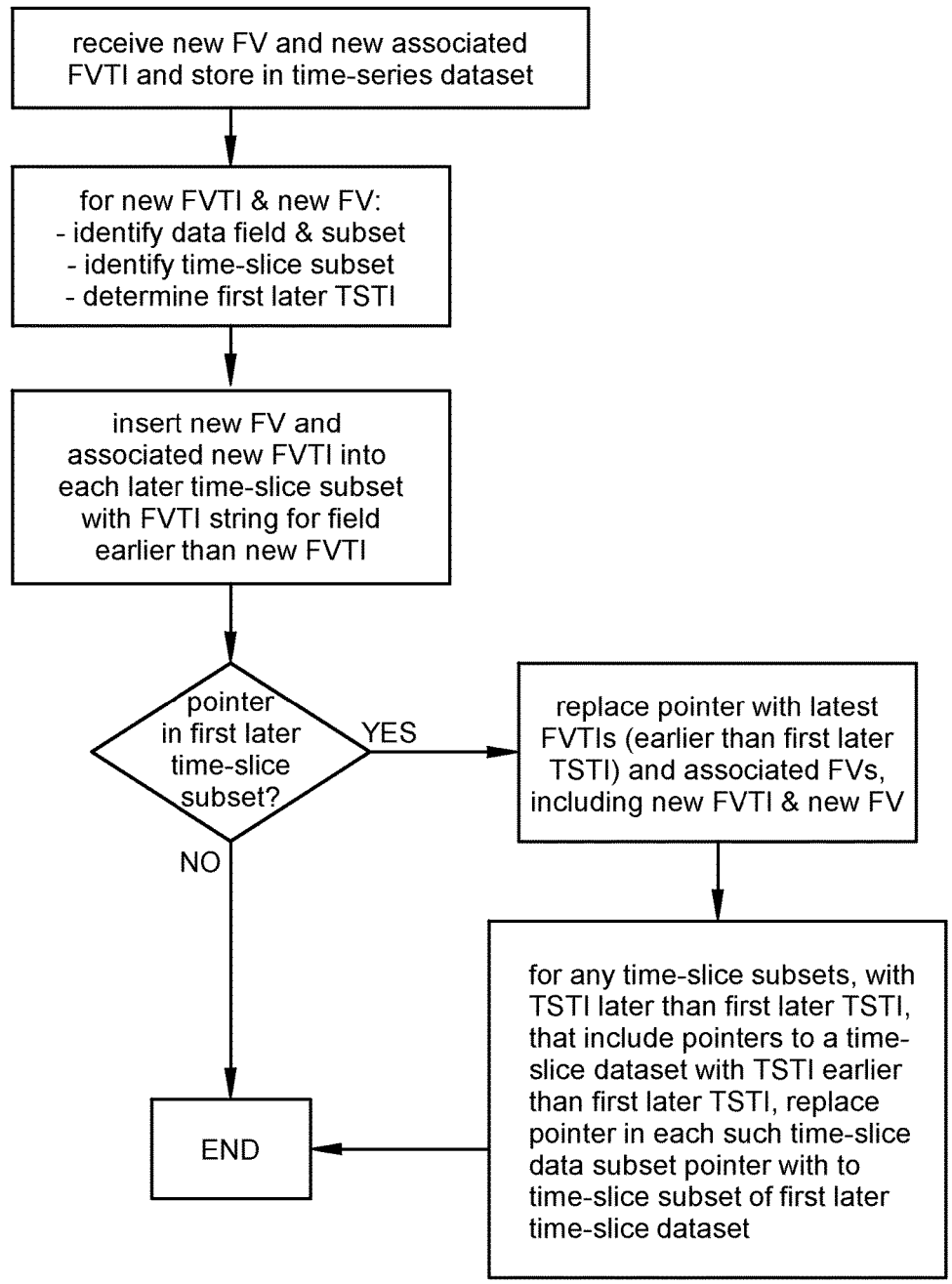
FIG. 6 illustrates schematically a method for inserting new data strings into the time-series dataset and into one or more of the time-slice datasets.

When a new FV data string and its associated new FVTI data string are received at the computer system, they are first included in and stored with the time-series dataset. The corresponding data field subset and corresponding time-slice data subsets are identified so as to indicate which portions of certain time-slice data subsets require updating (illustrative example shown in FIG. 6). The earliest TSTI among the time-slice datasets is determined that is later than the new FVTI (i.e., the first-later time slice is determined). If the time-slice data subset corresponding to the new FV data string in the first later time-slice includes a pointer, that pointer is replaced with the new FV data string and the associated new FVTI is included in the first-later time slice. If the replaced pointer also indicates other FV and FVTI data strings, those strings, or new pointers thereto, are included in the time-slice data subset along with the new FV and FVTI data strings. The corresponding time-slice data subsets of still-later time-slice datasets (i.e., later than the first-later time slice) that include corresponding FVTI data strings, or pointers thereto, that are earlier than the new FVTI data string, are also replaced with the new FV and FVTI data strings or pointers thereto in those later time-slice data subsets.

In instances where a group of fields or an entire time-slice data subset is indicated by a single pointer, the entire group or time-slice data subset of the first-later time slice is replaced with FV and FVTI data strings, including the new FV and FVTI data strings. In those instances, if any still-later time-slice data subsets include pointers to FVTI data strings earlier than the new FVTI data string, those pointers are replaced with pointers to the newly updated first-later time-slice data subset.

Although the present methods have been disclosed as pertaining to time-series datasets, they can also be employed for storing, updating, searching, and filtering datasets that can be arranged according to some other monotonically varying parameter. Some examples can include: oceanographic data, marine biology data, or geologic data can be collected at various depths, organized as a depth-series dataset, and queried with the assistance of multiple depth-slice datasets; atmospheric data can be collected at various altitudes, organized as an altitude-series dataset, and queried with the assistance of multiple altitude-slice datasets; astronomical data can be collected, evaluated to determine a corresponding spectral red-shift (functionally equivalent to distance), organized as a red-shift-series dataset, and queried with the assistance of multiple red-shift-slice datasets.

A computer system, comprising one or more electronic processors and one or more tangible, non-transitory computer-readable media, can be structured, connected, and programmed to perform any one or more of the preceding methods, including any one or more of the disclosed variations if desired. A tangible, non-transitory computer readable medium can encode computer-readable instructions that, when applied to a computer system, instruct the computer system to perform any one or more of the preceding methods, including any one or more of the disclosed variations. A tangible, non-transitory, computer-readable medium can be encoded to store the electronic indicia of the time-series dataset or one or more time-slice datasets generated and stored by any one or more of the preceding methods, including any one or more of the disclosed variations. A tangible, non-transitory, computer readable medium can be encoded with electronic indicia of a dataset similarly or analogously arranged that was generated or stored using any other suitable method or computer system.

The systems and methods disclosed or claimed herein can be advantageously employed in conjunction with any type of data structure for the time-series dataset and the multiple time-slice datasets, including data arranged as simple text or numerical table, one or more spreadsheets, one or more relational databases, or one or more specialized data structures, such as those disclosed in (i) U.S. Pat. No. 8,977,656, (ii) U.S. Pat. No. 8,990,204, (iii) U.S. Pat. No. 9,002,859, and (iv) U.S. Pat. No. 9,171,054 (each of which is incorporated by reference as if fully set forth herein). A specialized data structure can be specifically optimized for one or more of the methods disclosed or claimed herein.

Methods disclosed herein typically can be embodied as a computer program operating on one or more computers, computer systems, or servers, which include one or more processors and include or are otherwise operatively coupled to one or more tangible, non-transitory computer-readable media of any suitable type. The computers, systems, or servers that perform any given portion of the disclosed processes need not be, and sometimes are not, the same as those that perform the other portions of the disclosed processes. In all cases the computer, server, or system can be a stand-alone machine or can comprise one or machines connected by a local- or wide-area network (LAN or WAN) or the Internet. Any suitable hardware or hardware-plus-software implementation can be employed.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in tangible, non-transient, temporary or permanent storage or replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives. Electronic indicia of a dataset can be read from, received from, or stored on any of the tangible, non-transitory computer-readable media mentioned herein.

In addition to the preceding, the following examples fall within the scope of the present disclosure or appended claims:

Example 1

A computer-implemented method comprising: (a) automatically receiving at a computer system electronic indicia of a time-series dataset wherein (i) for each one of multiple defined data fields, the time-series dataset includes one or more corresponding field-value (FV) data strings, (ii) the time-series dataset includes multiple field-value-time-index (FVTI) data strings, and (iii) each one of the FV data strings is associated with a corresponding one of the multiple FVTI data strings that indicates a time when information represented by that FV data string was acquired, measured, generated, or recorded; (b) using one or more electronic processors of the computer system programmed therefor, automatically generating, using the electronic indicia of the time-series dataset, electronic indicia of multiple time-slice datasets, wherein (i) each one of the multiple time-slice datasets corresponds to a designated time-slice time index (TSTI) that differs from the corresponding TSTI of at least one other of the multiple time-slice datasets, (ii) for each one of multiple designated subsets of the multiple defined data fields, each time-slice dataset includes a corresponding time-slice data subset, (iii) each time-slice data subset includes, for each data field of the corresponding designated subset of the multiple data fields, (A) either a corresponding single FV data string from the time-series dataset or a pointer indicating, either directly or through one or more intervening pointers, a corresponding FV data string in a corresponding time-slice data subset with an earlier TSTI, and (B) for the FV data string included or indicated in subpart (A), either the associated FVTI data string from the time-series dataset or a pointer indicating, either directly or through one or more intervening pointers, the corresponding associated FVTI data string in a corresponding time-slice data subset with an earlier TSTI, and (iv) each FVTI data string included in, or indicated by a pointer of, each time-slice data subset represents a latest FVTI in the time-series dataset, for the associated FV data string, that is earlier than the TSTI of that time-slice data subset; and (c) automatically storing in a computer-searchable format the electronic indicia generated in part (b) on one or more tangible, non-transitory computer-readable media of the computer system that are operatively coupled to one or more electronic processors of the computer system.

Example 2

The computer-implemented method of Example 1 wherein any FVTI that indicates a time that is the same as a time indicated by a specified TSTI is included among FVTIs that are treated as being earlier than the specified TSTI.

Example 3

The computer-implemented method of Example 1 wherein any FVTI that indicates a time that is the same as a time indicated by a specified TSTI is included among FVTIs that are treated as being later than the specified TSTI.

Example 4

The computer-implemented method of any one of Examples 1 through 3 wherein each pointer in each time-slice data subset indicates directly a corresponding data string or pointer of a corresponding time-slice data subset in a next-earlier time-slice dataset.

Example 5

The computer-implemented method of any one of Examples 1 through 3 wherein each pointer in each time-slice data subset indicates directly a corresponding data string of a corresponding time-slice data subset with a latest corresponding TSTI, among those time-slice data subsets that include a corresponding data string, that is earlier than the corresponding TSTI.

Example 6

The computer-implemented method of any one of Examples 1 through 3 wherein, for at least one pointer of at least one time-slice data subset, having a first TSTI, (A) the at least one pointer indicates directly a corresponding data string or pointer of a corresponding time-slice data subset of an earlier time-slice dataset, having a second TSTI earlier than the first TSTI, and (B) the multiple time-slice datasets include at least one intervening time-slice dataset having an intervening TSTI earlier than the first TSTI and later than the second TSTI.

Example 7

The computer-implemented method of any one of Examples 1 through 6 wherein each time-slice data subset includes, for each data field of the corresponding designated subset of data fields, either (i) an FV data string and the associated FVTI data string, or (ii) a pointer to a corresponding FV data string of a corresponding earlier time-slice data subset and a pointer to a corresponding FVTI data string of a corresponding earlier time-slice data subset.

Example 8

The computer-implemented method of any one of Examples 1 through 7 wherein each time-slice data subset that includes one or more pointers includes only a single pointer indicating an entire corresponding earlier time-slice data subset.

Example 9

The computer-implemented method of any one of Examples 1 through 8 wherein the multiple time-slice datasets include an earliest time-slice dataset corresponding to an earliest TSTI earlier than corresponding TSTIs of every other one of the multiple time-slice datasets, wherein the earliest TSTI is earlier than every FVTI of the time-series dataset and every time-slice data subset of the earliest time-slice dataset includes one or more data strings and no pointers.

Example 10

The computer-implemented method of any one of Examples 1 through 9 wherein the multiple time-slice datasets include a latest time-slice dataset corresponding to a latest TSTI later than corresponding TSTIs of every other one of the multiple time-slice datasets, wherein the latest TSTI is later than every FVTI of the time-series dataset and every time-slice data subset of the latest time-slice dataset includes one or more pointers and no data strings.

Example 11

The computer-implemented method of any one of Example 1 through 10 further comprising: (d) using one or more electronic processors of the computer system programmed therefor, automatically determining a latest TSTI occurring among the multiple time-slice datasets that is earlier than a new designated TSTI; (e) using one or more electronic processors of the computer system programmed therefor, for each one of the multiple defined data fields, automatically identifying corresponding FVTI data strings indicating a latest FVTI of the time-series dataset that is later than the latest TSTI determined in part (d) and earlier than the new designated TSTI; (f) using one or more electronic processors of the computer system programmed therefor, for each designated subset of the multiple data fields for which at least one corresponding latest FVTI data string is identified in part (e), automatically including, in a corresponding time-slice data subset of a new time-slice dataset, (i) each identified latest FVTI data string and the associated FV data string, and (ii) for each data field of the designated subset for which no FVTI data string is identified in part (e), one or more FV data strings, one or more FVTI data strings, or one or more pointers that indicate a latest FVTI in the time-series dataset, that is earlier than the new TSTI, and the associated FV data string; (g) using one or more electronic processors of the computer system programmed therefor, for each designated subset of the multiple data fields for which no corresponding FVTI data string is identified in part (e), automatically including, in a corresponding time-slice data subset of the new time-slice dataset, one or more data strings or one or more pointers that collectively indicate, in the corresponding time-slice data subset with an earlier TSTI, the latest FVTI data strings earlier than the new TSTI and the associated FV data strings; and (h) automatically generating, and automatically storing in the computer-searchable format on one or more tangible, non-transitory computer-readable media of the computer system that are operatively coupled to one or more electronic processors of the computer system, electronic indicia of the new time-slice dataset that includes the time-slice data subsets of parts (f) and (g) and corresponds to the new designated TSTI.

Example 12

The computer-implemented method of Example 11 wherein part (f) includes, using one or more electronic processors of the computer system programmed therefor, for each designated subset of the multiple data fields for which at least one corresponding latest FVTI data string is identified in part (e), automatically including, in a corresponding time-slice data subset of a new time-slice dataset, for each one of the data fields of the designated subset, the corresponding FV data string and associated FVTI data string corresponding to a latest FVTI that is earlier than the new TSTI.

Example 13

The computer-implemented method of any one of Examples 11 or 12 wherein the identification of part (e) includes automatically electronically querying the electronic indicia of the time-series dataset to identify corresponding FVTI data strings later than the latest TSTI determined in part (d) and earlier than the new designated TSTI.

Example 14

The computer-implemented method of Example 13 wherein the identification of part (e) includes, for each one of the multiple defined data fields, using one or more electronic processors of the computer system programmed therefor, (A) determining an earliest TSTI among the time-slice datasets that is later than the new designated TSTI, and (B) for each field for which the corresponding time-slice data subset with the TSTI determined in part (A) includes a pointer, excluding that field from the electronic querying of the time-series dataset and identifying as the latest FVTI the corresponding FVTI indicated by the pointer.

Example 15

The computer-implemented method of any one of Examples 13 or 14 wherein the identification of part (e) includes, for each one of the multiple defined data fields, using one or more electronic processors of the computer system programmed therefor, for each field for which a corresponding time-slice data subset, having a corresponding TSTI later than the new designated TSTI, includes or indicates with a pointer an FVTI data string earlier than the latest TSTI determined in part (d), excluding that field from the electronic querying of the time-series dataset and identifying as the latest TSTI the included or indicated FVTI data string.

Example 16

The computer-implemented method of any one of Examples 13 through 15 wherein the identification of part (e) includes, for each one of the multiple defined data fields, using one or more electronic processors of the computer system programmed therefor, (A) determining an earliest TSTI among the time-slice datasets that is later than the new designated TSTI, and (B) for each field for which the corresponding time-slice data subset with the TSTI determined in part (A) includes or indicates with a pointer an FVTI data string earlier than the latest TSTI determined in part (d), excluding that field from the electronic querying of the time-series dataset and identifying as the latest TSTI the included or indicated FVTI data string.

Example 17

The computer-implemented method of any one of Examples 11 through 16 further comprising: (i) using one or more electronic processors of the computer system programmed therefor, for each designated subset of the multiple data fields for which at least one corresponding FVTI data string is identified in part (e), identifying one or more corresponding time-slice data subsets, with corresponding TSTIs later than the new designated TSTI, that include one or more pointers indicating corresponding FVTI data strings or associated FV data strings in corresponding time-slice data subsets with corresponding TSTIs earlier than the new designated TSTI; (j) using one or more electronic processors of the computer system programmed therefor, for each time-slice data subset identified in part (i), automatically replacing the one or more corresponding pointers with one or more corresponding new pointers that indicate the corresponding FV or FVTI data string of the new time-slice dataset; and (k) automatically updating, on one or more tangible, non-transitory computer-readable media of the computer system that are operationally coupled to one or more electronic processors of the computer system, electronic indicia of the replaced pointers of part (j).

Example 18

The computer-implemented method of any one of Examples 1 through 17 further comprising: (d) automatically receiving at the computer system electronic indicia of a new FV data string for a corresponding one of the defined data fields and a new associated FVTI data string indicating a new FVTI of a time when the new FV data string was acquired, measured, generated, or recorded; (e) using one or more electronic processors of the computer system programmed therefor, automatically including the new FV and FVTI data strings in the time-series dataset; and (f) using one or more electronic processors of the computer system programmed therefor, automatically generating, and automatically storing in the computer searchable format on one or more tangible, non-transitory computer-readable media of the computer system that are operationally coupled to one or more electronic processors of the computer system, electronic indicia of the new FV and FVTI data strings as part of the electronic indicia of the time-series dataset.

Example 19

The computer-implemented method of Example 18 further comprising: (g) using one or more electronic processors of the computer system programmed therefor, automatically identifying which one of the multiple designated subsets of the multiple data fields includes the data field of part (d) and identifying the time-slice data subset corresponding to that designated subset; (h) using one or more electronic processors of the computer system programmed therefor, automatically determining an earliest TSTI that is later than the new FVTI; (i) for each TSTI identified in part (h) that corresponds to a time-slice dataset having a pointer in the time-slice data subset identified in part (g) for the data field of part (d), using one or more electronic processors of the computer system programmed therefor, automatically replacing that pointer with the new FV data string and the associated new FVTI data string for the data field of part (d); (j) using one or more electronic processors of the computer system programmed therefor, for each time-slice data subset that is identified in part (g), that corresponds to a TSTI later than the TSTI determined in part (h), and that includes for the field of part (d) an FVTI data string earlier than the new FVTI or a pointer indicating an FVTI data string earlier than the new FVTI, automatically replacing in that time-slice data subset the earlier FVTI data string, the associated FV data string, or one or more pointers thereto with the new FVTI data string, the associated new FV data string, or one or more pointers indicating those new data strings in the time-slice data subset of part (i); (h) automatically generating, and automatically storing in the computer-searchable format on one or more tangible, non-transitory computer-readable media of the computer system that are operatively coupled to one or more electronic processors of the computer system, electronic indicia of the time-slice data subsets altered in parts (i) and (j).

Example 20

The computer-implemented method of Example 18 further comprising: (g) using one or more electronic processors of the computer system programmed therefor, automatically identifying which one of the multiple designated subsets of the multiple data fields includes the data field of part (d) and identifying the time-slice data subset corresponding to that designated subset; (h) using one or more electronic processors of the computer system programmed therefor, automatically determining an earliest TSTI that is later than the new FVTI; (i) using one or more electronic processors of the computer system programmed therefor, for each time-slice data subset that is identified in part (g), that corresponds to a TSTI later than the TSTI determined in part (h), and that includes for the field of part (d) an FVTI data string for an FVTI earlier than the new FVTI, automatically replacing in that time-slice data subset the earlier FVTI data string with the new FVTI data string and the earlier FV data string with the new FV data string; (j) for each TSTI identified in part (h) that corresponds to a time-slice dataset having a pointer in the time-slice data subset identified in part (g), using one or more electronic processors of the computer system programmed therefor, automatically replacing that pointer with, for each one of the data fields of the designated subset identified in part (g), the corresponding FV data string and associated FVTI data string corresponding to a latest FVTI that is earlier than the TSTI identified in part (h), including the new FV data string and the associated new FVTI data string for the data field of part (d); (k) using one or more electronic processors of the computer system programmed therefor, automatically identifying each corresponding time-slice data subset of each time-slice dataset, that corresponds to a TSTI later than the TSTI determined in part (h), that includes a pointer indicating a time-slice data subset in a time-slice dataset that corresponds to a TSTI earlier than the TSTI determined in part (h); (l) for each time-slice data subset identified in part (k), using one or more electronic processors of the computer system programmed therefor, automatically replacing the corresponding pointer with a corresponding new pointer that indicates the corresponding time-slice data subset of the time-slice dataset corresponding to the TSTI determined in part (h); and (m) automatically generating, and automatically storing in the computer-searchable format on one or more tangible, non-transitory computer-readable media of the computer system that are operatively coupled to one or more electronic processors of the computer system, electronic indicia of the time-slice data subsets altered in parts (i), (j), and (l).

Example 21

A computer-implemented method for searching or filtering a time-series dataset using multiple time-slice datasets generated using the method of any one of Examples 1 through 20: (a) wherein (i) electronic indicia of the time-series dataset are stored in a computer-searchable format on one or more tangible, non-transitory computer-readable media of the computer system, (ii) for each one of multiple defined data fields, the time-series dataset includes one or more corresponding field-value (FV) data strings, (iii) the time-series dataset includes multiple field-value-time-index (FVTI) data strings, and (iv) each one of the FV data strings is associated with a corresponding one of the multiple FVTI data strings that indicates a time when information represented by that FV data string was acquired, measured, generated, or recorded; and (b) wherein (i) electronic indicia of multiple time-slice datasets are stored in a computer-searchable format on one or more tangible, non-transitory computer-readable media of the computer system, (ii) each one of the multiple time-slice datasets corresponds to a designated time-slice time index (TSTI) that differs from the corresponding TSTI of at least one other of the multiple time-slice datasets, (iii) for each one of multiple designated subsets of the multiple defined data fields, each time-slice dataset includes a corresponding time-slice data subset, (iv) each time-slice data subset includes, for each data field of the corresponding designated subset of the multiple data fields, (A) either a corresponding single FV data string from the time-series dataset or a pointer indicating, either directly or through one or more intervening pointers, a corresponding FV data string in a corresponding time-slice data subset with an earlier TSTI, and (B) for the FV data string included or indicated in subpart (A), either the associated FVTI data string from the time-series dataset or a pointer indicating, either directly or through one or more intervening pointers, the corresponding associated FVTI data string in a corresponding time-slice data subset with an earlier TSTI, and (v) each FVTI data string included in, or indicated by a pointer of, each time-slice data subset represents a latest FVTI in the time-series dataset, for the associated FV data string, that is earlier than the TSTI of that time-slice data subset, the method comprising: (A) receiving at the computer system an electronic query for a list, tabulation, graph, display, or enumeration of FV data strings, of a queried subset of the multiple data fields specified in the query, having latest associated FVTI data strings earlier than a query time index (QTI); (B) using one or more electronic processors of the computer system programmed therefor, for each field of the queried subset, automatically identifying a corresponding latest FVTI data string that is earlier than the QTI; (C) using one or more electronic processors of the computer system programmed therefor, automatically electronically interrogating the FVTI data strings identified in part (B) or the FV data strings associated with the FVTI data strings identified in part (B); (D) using one or more electronic processors, displays, or tangible, non-transitory computer-readable media of the computer system, listing, tabulating, graphing, displaying, or enumerating FV or FVTI data strings, among the FV or FVTI data strings interrogated in part (C), that satisfy one or more search or filter criteria included in the query of part (A).

Example 22

The computer-implemented method of Example 21 wherein the identification of part (B) includes automatically electronically querying the electronic indicia of the time-series dataset to identify one or more corresponding latest FVTI data strings that are earlier than the QTI.

Example 23

The computer-implemented invention of Example 22 further comprising, using one or more electronic processors of the computer system programmed therefor, (i) determining a latest TSTI among the time-slice datasets that is earlier than the QTI, and (ii) for each queried field for which no FVTI is identified in the time-series dataset that is later than the TSTI determined in part (i) and earlier than the QTI, excluding that field from the electronic querying of the time-series dataset and identifying as the latest FVTI data string an FVTI data string included in or indicated by a pointer of a corresponding time-slice data subset with the TSTI determined in part (i).

Example 24

The computer-implemented method of any one of Examples 22 or 23 further comprising, using one or more electronic processors of the computer system programmed therefor, (i) automatically determining an earliest TSTI among the time-slice datasets that is later than the QTI, and (ii) for each queried field for which the corresponding time-slice data subset with the TSTI determined in part (i) includes a pointer indicating an FVTI data string, excluding that field from the electronic querying of the time-series dataset and identifying as the latest FVTI data string the corresponding FVTI data string indicated by the pointer.

Example 25

The computer-implemented method of any one of Examples 22 through 24 further comprising, using one or more electronic processors of the computer system programmed therefor, (i) determining an earliest TSTI among the time-slice datasets that is later than the QTI, and (ii) for each queried field for which the corresponding time-slice data subset with the TSTI determined in part (i) includes or indicates with a pointer an FVTI data string earlier than the QTI, excluding that field from the electronic querying of the time-series dataset and identifying as the latest FVTI data string the included or indicated FVTI data string.

Example 26

The computer-implemented method of any one of Examples 22 through 25 further comprising, using one or more electronic processors of the computer system programmed therefor, for each queried field for which a corresponding time-slice data subset, having a corresponding TSTI later than the QTI, includes or indicates with a pointer an FVTI data string earlier than the QTI, excluding that field from the electronic querying of the time-series dataset and identifying as the latest FVTI data string the included or indicated FVTI data string.

Example 27

The computer-implemented method of any one of Examples 21 through 26 wherein any FVTI that indicates a time that is the same as a time indicated by the QTI is included among FVTIs that are treated as being earlier than the QTI, and any TSTI that indicates a time that is the same as a time indicated by the QTI is included among TSTIs that are treated as being earlier than the QTI.

Example 28

The computer-implemented method of any one of Examples 21 through 26 wherein any FVTI that indicates a time that is the same as a time indicated by the QTI is included among FVTIs that are treated as being later than the QTI, and any TSTI that indicates a time that is the same as a time indicated by the QTI is included among TSTIs that are treated as being later than the QTI.

Example 29

The computer-implemented method of any one of Examples 21 through 26 wherein any FVTI that indicates a time that is the same as a time indicated by the QTI is included among FVTIs that are treated as being earlier than the QTI, and any TSTI that indicates a time that is the same as a time indicated by the QTI is included among QTIs that are later than the TSTI.

Example 30

The computer-implemented method of any one of Examples 21 through 26 wherein any FVTI that indicates a time that is the same as a time indicated by the QTI is included among FVTIs that are later than the QTI, and any TSTI that indicates a time that is the same as a time indicated by the QTI is included among TSTIs that are earlier than the TSTI.

Example 31

The computer-implemented method of any one of Examples 21 through 30 wherein: (i) the identification of part (B) includes automatically generating one or more additional time-slice datasets with corresponding additional TSTIs; and (ii) the interrogation of part (C) includes automatically interrogating (1) FV data strings included in, or indicated by corresponding pointers of, the one or more additional time-slice datasets, or (2) FVTI data strings included in, or indicated by corresponding pointers of, the one or more additional time-slice datasets.

Example 32

The computer-implemented method of Example 31 wherein the one or more additional time-slice datasets are generated without altering the multiple time-slice datasets.

Example 33

The computer-implemented method of any one of Examples 31 or 32 wherein one of the one or more additional time-slice datasets has a corresponding additional TSTI that indicates a time indicated by the QTI.

Example 34

The computer-implemented method of any one of Examples 31 through 33 further comprising: (iii) receiving multiple different electronic queries of part (A) having the same QTI; (iv) for each received query, automatically interrogating (1) FV data strings included in, or indicated by corresponding pointers of, the additional time-slice dataset, or (2) FVTI data strings included in, or indicated by corresponding pointers of, the additional time-slice dataset; and (v) for each received query, listing, tabulating, graphing, displaying, or enumerating FV or FVTI data strings, among the FV or FVTI data strings interrogated in part (iv), that satisfy one or more search or filter criteria included in the corresponding query of part (iii).

Example 35

The computer-implemented method of any one of Examples 31 through 34 further comprising deactivating the one or more additional time-slice datasets.

Example 36

A computer system comprising one or more electronic processors and one or more tangible, non-transitory computer-readable media each operatively coupled to one or more of the processors, wherein the computer system is structured, connected, and programmed to perform the method of any one of Examples 1 through 35.

Example 37

A tangible, non-transitory computer-readable medium encoded with electronic indicia of instructions which, when applied to a computer system, cause the computer system to perform the method of any one of Examples 1 through 35.

Example 38

A tangible, non-transitory computer-readable medium encoded with the electronic indicia of the multiple time-slice datasets generated by the method of any one of Examples 1 through 20.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer-implemented method comprising:
   (a) automatically receiving at a computer system electronic indicia of a time-series dataset wherein
       (i) for each one of multiple defined data fields, the time-series dataset includes one or more corresponding field-value (FV) data strings,
       (ii) the time-series dataset includes multiple field-value-time-index (FVTI) data strings, and
       (iii) each one of the FV data strings is associated with a corresponding one of the multiple FVTI data strings that indicates a time when information represented by that FV data string was acquired, measured, generated, or recorded;
   (b) using one or more electronic processors of the computer system programmed therefor, automatically generating, using the electronic indicia of the time-series dataset, electronic indicia of multiple time-slice datasets, wherein
       (i) each one of the multiple time-slice datasets corresponds to a designated time-slice time index (TSTI) that differs from the corresponding TSTI of at least one other of the multiple time-slice datasets,
       (ii) for each one of multiple designated subsets of the multiple defined data fields, each time-slice dataset includes a corresponding time-slice data subset,
       (iii) each time-slice data subset includes, for each data field of the corresponding designated subset of the multiple data fields, (A) either a corresponding single FV data string from the time-series dataset or a pointer indicating, either directly or through one or more intervening pointers, a corresponding FV data string in a corresponding time-slice data subset with an earlier TSTI, and (B) for the FV data string included or indicated in subpart (A), either the associated FVTI data string from the time-series dataset or a pointer indicating, either directly or through one or more intervening pointers, the corresponding associated FVTI data string in a corresponding time-slice data subset with an earlier TSTI, and
       (iv) each FVTI data string included in, or indicated by a pointer of, each time-slice data subset represents a latest FVTI in the time-series dataset, for the associated FV data string, that is earlier than the TSTI of that time-slice data subset; and
   (c) automatically storing in a computer-searchable format the electronic indicia generated in part (b) on one or more tangible, non-transitory computer-readable media of the computer system that are operatively coupled to one or more electronic processors of the computer system.

2. The computer-implemented method of claim 1 wherein any FVTI that indicates a time that is the same as a time indicated by a specified TSTI is included among FVTIs that are treated as being earlier than the specified TSTI.

3. The computer-implemented method of claim 1 wherein any FVTI that indicates a time that is the same as a time indicated by a specified TSTI is included among FVTIs that are treated as being later than the specified TSTI.

4. The computer-implemented method of claim 1 wherein each pointer in each time-slice data subset indicates directly a corresponding data string or pointer of a corresponding time-slice data subset in a next-earlier time-slice dataset.

5. The computer-implemented method of claim 1 wherein each pointer in each time-slice data subset indicates directly a corresponding data string of a corresponding time-slice data subset with a latest corresponding TSTI, among those time-slice data subsets that include a corresponding data string, that is earlier than the corresponding TSTI.

6. The computer-implemented method of claim 1 wherein, for at least one pointer of at least one time-slice data subset, having a first TSTI, (A) the at least one pointer indicates directly a corresponding data string or pointer of a corresponding time-slice data subset of an earlier time-slice dataset, having a second TSTI earlier than the first TSTI, and (B) the multiple time-slice datasets include at least one intervening time-slice dataset having an intervening TSTI earlier than the first TSTI and later than the second TSTI.

7. The computer-implemented method of claim 1 wherein each time-slice data subset includes, for each data field of the corresponding designated subset of data fields, either (i) an FV data string and the associated FVTI data string, or (ii) a pointer to a corresponding FV data string of a corresponding earlier time-slice data subset and a pointer to a corresponding FVTI data string of a corresponding earlier time-slice data subset.

8. The computer-implemented method of claim 7 wherein each time-slice data subset that includes one or more pointers includes only a single pointer indicating an entire corresponding earlier time-slice data subset.

9. The computer-implemented method of claim 1 wherein the multiple time-slice datasets include an earliest time-slice dataset corresponding to an earliest TSTI earlier than corresponding TSTIs of every other one of the multiple time-slice datasets, wherein the earliest TSTI is earlier than every FVTI of the time-series dataset and every time-slice data subset of the earliest time-slice dataset includes one or more data strings and no pointers.

10. The computer-implemented method of claim 1 wherein the multiple time-slice datasets include a latest time-slice dataset corresponding to a latest TSTI later than corresponding TSTIs of every other one of the multiple time-slice datasets, wherein the latest TSTI is later than every FVTI of the time-series dataset and every time-slice data subset of the latest time-slice dataset includes one or more pointers and no data strings.

11. A computer system comprising one or more electronic processors and one or more tangible, non-transitory computer-readable media each operatively coupled to one or more of the processors, wherein the computer system is structured, connected, and programmed to perform the method of claim 1.

12. A tangible, non-transitory computer-readable medium encoded with electronic indicia of instructions which, when applied to a computer system, cause the computer system to perform the method of claim 1.

13. A tangible, non-transitory computer-readable medium encoded with the electronic indicia of the multiple time-slice datasets generated by the method of claim 1.

14. The computer-implemented method of claim 1 further comprising:

(d) using one or more electronic processors of the computer system programmed therefor, automatically determining a latest TSTI occurring among the multiple time-slice datasets that is earlier than a new designated TSTI;

(e) using one or more electronic processors of the computer system programmed therefor, for each one of the multiple defined data fields, automatically identifying corresponding FVTI data strings indicating a latest FVTI of the time-series dataset that is later than the latest TSTI determined in part (d) and earlier than the new designated TSTI;

(f) using one or more electronic processors of the computer system programmed therefor, for each designated subset of the multiple data fields for which at least one corresponding latest FVTI data string is identified in part (e), automatically including, in a corresponding time-slice data subset of a new time-slice dataset, (i) each identified latest FVTI data string and the associated FV data string, and (ii) for each data field of the designated subset for which no FVTI data string is identified in part (e), one or more FV data strings, one or more FVTI data strings, or one or more pointers that indicate a latest FVTI in the time-series dataset, that is earlier than the new TSTI, and the associated FV data string;

(g) using one or more electronic processors of the computer system programmed therefor, for each designated subset of the multiple data fields for which no corresponding FVTI data string is identified in part (e), automatically including, in a corresponding time-slice data subset of the new time-slice dataset, one or more data strings or one or more pointers that collectively indicate, in the corresponding time-slice data subset with an earlier TSTI, the latest FVTI data strings earlier than the new TSTI and the associated FV data strings; and (h) automatically generating, and automatically storing in the computer-searchable format on one or more tangible, non-transitory computer-readable media of the computer system that are operatively coupled to one or more electronic processors of the computer system, electronic indicia of the new time-slice dataset that includes the time-slice data subsets of parts (f) and (g) and corresponds to the new designated TSTI.

15. The computer-implemented method of claim 14 wherein part (f) includes, using one or more electronic processors of the computer system programmed therefor, for each designated subset of the multiple data fields for which at least one corresponding latest FVTI data string is identified in part (e), automatically including, in a corresponding time-slice data subset of a new time-slice dataset, for each one of the data fields of the designated subset, the corresponding FV data string and associated FVTI data string corresponding to a latest FVTI that is earlier than the new TSTI.

16. The computer-implemented method of claim 14 wherein the identification of part (e) includes automatically electronically querying the electronic indicia of the time-series dataset to identify corresponding FVTI data strings later than the latest TSTI determined in part (d) and earlier than the new designated TSTI.

17. The computer-implemented method of claim 16 wherein the identification of part (e) includes, for each one of the multiple defined data fields, using one or more electronic processors of the computer system programmed therefor, (A) determining an earliest TSTI among the time-slice datasets that is later than the new designated TSTI, and (B) for each field for which the corresponding time-slice data subset with the TSTI determined in part (A) includes a pointer, excluding that field from the electronic querying of the time-series dataset and identifying as the latest FVTI the corresponding FVTI indicated by the pointer.

18. The computer-implemented method of claim 16 wherein the identification of part (e) includes, for each one of the multiple defined data fields, using one or more electronic processors of the computer system programmed therefor, (A) determining an earliest TSTI among the time-slice datasets that is later than the new designated TSTI, and (B) for each field for which the corresponding time-slice data subset with the TSTI determined in part (A) includes or indicates with a pointer an FVTI data string earlier than the latest TSTI determined in part (d), excluding that field from the electronic querying of the time-series dataset and identifying as the latest TSTI the included or indicated FVTI data string.

19. The computer-implemented method of claim 16 wherein the identification of part (e) includes, for each one of the multiple defined data fields, using one or more electronic processors of the computer system programmed therefor, for each field for which a corresponding time-slice data subset, having a corresponding TSTI later than the new designated TSTI, includes or indicates with a pointer an FVTI data string earlier than the latest TSTI determined in part (d), excluding that field from the electronic querying of the time-series dataset and identifying as the latest TSTI the included or indicated FVTI data string.

20. The computer-implemented method of claim 14 further comprising:
(i) using one or more electronic processors of the computer system programmed therefor, for each designated subset of the multiple data fields for which at least one corresponding FVTI data string is identified in part (e), identifying one or more corresponding time-slice data subsets, with corresponding TSTIs later than the new designated TSTI, that include one or more pointers indicating corresponding FVTI data strings or associated FV data strings in corresponding time-slice data subsets with corresponding TSTIs earlier than the new designated TSTI;
(j) using one or more electronic processors of the computer system programmed therefor, for each time-slice data subset identified in part (i), automatically replacing the one or more corresponding pointers with one or more corresponding new pointers that indicate the corresponding FV or FVTI data string of the new time-slice dataset; and
(k) automatically updating, on one or more tangible, non-transitory computer-readable media of the computer system that are operationally coupled to one or more electronic processors of the computer system, electronic indicia of the replaced pointers of part (j).

21. A computer system comprising one or more electronic processors and one or more tangible, non-transitory computer-readable media each operatively coupled to one or more of the processors, wherein the computer system is structured, connected, and programmed to perform the method of claim 14.

22. A tangible, non-transitory computer-readable medium encoded with electronic indicia of instructions which, when applied to a computer system, cause the computer system to perform the method of claim 14.

23. A tangible, non-transitory computer-readable medium encoded with the electronic indicia of the multiple time-slice datasets generated by the method of claim 14.

24. The computer-implemented method of claim 1 further comprising:
(d) automatically receiving at the computer system electronic indicia of a new FV data string for a corresponding one of the defined data fields and a new associated FVTI data string indicating a new FVTI of a time when the new FV data string was acquired, measured, generated, or recorded;
(e) using one or more electronic processors of the computer system programmed therefor, automatically including the new FV and FVTI data strings in the time-series dataset; and
(f) using one or more electronic processors of the computer system programmed therefor, automatically generating, and automatically storing in the computer searchable format on one or more tangible, non-transitory computer-readable media of the computer system that are operationally coupled to one or more electronic processors of the computer system, electronic indicia of the new FV and FVTI data strings as part of the electronic indicia of the time-series dataset.

25. The computer-implemented method of claim 24 further comprising:
(g) using one or more electronic processors of the computer system programmed therefor, automatically identifying which one of the multiple designated subsets of the multiple data fields includes the data field of part (d) and identifying the time-slice data subset corresponding to that designated subset;
(h) using one or more electronic processors of the computer system programmed therefor, automatically determining an earliest TSTI that is later than the new FVTI;
(i) for each TSTI identified in part (h) that corresponds to a time-slice dataset having a pointer in the time-slice data subset identified in part (g) for the data field of part (d), using one or more electronic processors of the computer system programmed therefor, automatically replacing that pointer with the new FV data string and the associated new FVTI data string for the data field of part (d);
(j) using one or more electronic processors of the computer system programmed therefor, for each time-slice data subset that is identified in part (g), that corresponds to a TSTI later than the TSTI determined in part (h), and that includes for the field of part (d) an FVTI data string earlier than the new FVTI or a pointer indicating an FVTI data string earlier than the new FVTI, automatically replacing in that time-slice data subset the earlier FVTI data string, the associated FV data string, or one or more pointers thereto with the new FVTI data string, the associated new FV data string, or one or more pointers indicating those new data strings in the time-slice data subset of part (i);
(k) automatically generating, and automatically storing in the computer-searchable format on one or more tangible, non-transitory computer-readable media of the computer system that are operatively coupled to one or more electronic processors of the computer system, electronic indicia of the time-slice data subsets altered in parts (i) and (j).

26. The computer-implemented method of claim 24 further comprising:

(g) using one or more electronic processors of the computer system programmed therefor, automatically identifying which one of the multiple designated subsets of the multiple data fields includes the data field of part (d) and identifying the time-slice data subset corresponding to that designated subset;

(h) using one or more electronic processors of the computer system programmed therefor, automatically determining an earliest TSTI that is later than the new FVTI;

(i) using one or more electronic processors of the computer system programmed therefor, for each time-slice data subset that is identified in part (g), that corresponds to a TSTI later than the TSTI determined in part (h), and that includes for the field of part (d) an FVTI data string for an FVTI earlier than the new FVTI, automatically replacing in that time-slice data subset the earlier FVTI data string with the new FVTI data string and the earlier FV data string with the new FV data string;

(j) for each TSTI identified in part (h) that corresponds to a time-slice dataset having a pointer in the time-slice data subset identified in part (g), using one or more electronic processors of the computer system programmed therefor, automatically replacing that pointer with, for each one of the data fields of the designated subset identified in part (g), the corresponding FV data string and associated FVTI data string corresponding to a latest FVTI that is earlier than the TSTI identified in part (h), including the new FV data string and the associated new FVTI data string for the data field of part (d);

(k) using one or more electronic processors of the computer system programmed therefor, automatically identifying each corresponding time-slice data subset of each time-slice dataset, that corresponds to a TSTI later than the TSTI determined in part (h), that includes a pointer indicating a time-slice data subset in a time-slice dataset that corresponds to a TSTI earlier than the TSTI determined in part (h);

(l) for each time-slice data subset identified in part (k), using one or more electronic processors of the computer system programmed therefor, automatically replacing the corresponding pointer with a corresponding new pointer that indicates the corresponding time-slice data subset of the time-slice dataset corresponding to the TSTI determined in part (h); and (m) automatically generating, and automatically storing in the computer-searchable format on one or more tangible, non-transitory computer-readable media of the computer system that are operatively coupled to one or more electronic processors of the computer system, electronic indicia of the time-slice data subsets altered in parts (i), (j), and (l).

27. A computer system comprising one or more electronic processors and one or more tangible, non-transitory computer-readable media each operatively coupled to one or more of the processors, wherein the computer system is structured, connected, and programmed to perform the method of claim 24.

28. A tangible, non-transitory computer-readable medium encoded with electronic indicia of instructions which, when applied to a computer system, cause the computer system to perform the method of claim 24.

29. A tangible, non-transitory computer-readable medium encoded with the electronic indicia of the multiple time-slice datasets generated by the method of claim 24.

30. The computer-implemented method of claim 1 wherein the corresponding TSTIs of the multiple time-slice datasets are spaced at irregular time intervals.

31. The computer-implemented method of claim 1 wherein the corresponding FVTIs of each one of the multiple data fields differ from the corresponding FVTIs of at least one other of the multiple data fields with respect to regular or irregular time intervals between successive FVTIs for each data field.

32. A computer-implemented method for searching or filtering a time-series dataset:

(a) wherein (i) electronic indicia of the time-series dataset are stored in a computer-searchable format on one or more tangible, non-transitory computer-readable media of a computer system, (ii) for each one of multiple defined data fields, the time-series dataset includes one or more corresponding field-value (FV) data strings, (iii) the time-series dataset includes multiple field-value-time-index (FVTI) data strings, and (iv) each one of the FV data strings is associated with a corresponding one of the multiple FVTI data strings that indicates a time when information represented by that FV data string was acquired, measured, generated, or recorded; and (b) wherein (i) electronic indicia of multiple time-slice datasets are stored in a computer-searchable format on one or more tangible, non-transitory computer-readable media of the computer system, (ii) each one of the multiple time-slice datasets corresponds to a designated time-slice time index (TSTI) that differs from the corresponding TSTI of at least one other of the multiple time-slice datasets, (iii) for each one of multiple designated subsets of the multiple defined data fields, each time-slice dataset includes a corresponding time-slice data subset, (iv) each time-slice data subset includes, for each data field of the corresponding designated subset of the multiple data fields, (A) either a corresponding single FV data string from the time-series dataset or a pointer indicating, either directly or through one or more intervening pointers, a corresponding FV data string in a corresponding time-slice data subset with an earlier TSTI, and (B) for the FV data string included or indicated in subpart (A), either the associated FVTI data string from the time-series dataset or a pointer indicating, either directly or through one or more intervening pointers, the corresponding associated FVTI data string in a corresponding time-slice data subset with an earlier TSTI, and (v) each FVTI data string included in, or indicated by a pointer of, each time-slice data subset represents a latest FVTI in the time-series dataset, for the associated FV data string, that is earlier than the TSTI of that time-slice data subset, the method comprising:

(A) receiving at the computer system an electronic query for a list, tabulation, graph, display, or enumeration of FV data strings, of a queried subset of the multiple data fields specified in the query, having latest associated FVTI data strings earlier than a query time index (QTI);

(B) using one or more electronic processors of the computer system programmed therefor, for each field of the queried subset, automatically identifying a corresponding latest FVTI data string that is earlier than the QTI;

(C) using one or more electronic processors of the computer system programmed therefor, automatically electronically interrogating the FVTI data strings identified in part (B) or the FV data strings associated with the FVTI data strings identified in part (B);

(D) using one or more electronic processors, displays, or tangible, non-transitory computer-readable media of the computer system, listing, tabulating, graphing, displaying, or enumerating FV or FVTI data strings, among the FV or FVTI data strings interrogated in part (C), that satisfy one or more search or filter criteria included in the query of part (A), (E) wherein the identification of part (B) includes automatically electronically querying the electronic indicia of the time-series dataset to identify one or more corresponding latest FVTI data strings that are earlier than the QTI, and the method further comprises one or more of:

(F) using one or more electronic processors of the computer system programmed therefor, (i) determining a latest TSTI among the time-slice datasets that is earlier than the QTI, (ii) identifying each queried field for which no FVTI is identified in the time-series dataset that is later than the TSTI determined in part (F)(i) and earlier than the QTI, (iii) excluding from the electronic querying of the time-series dataset each queried field identified in part (F)(ii), and (iv) for each queried field identified in part (F)(ii), identifying as the latest FVTI data string an FVTI data string included in or indicated by a pointer of a corresponding time-slice data subset with the TSTI determined in part (F)(i);

(G) using one or more electronic processors of the computer system programmed therefor, (i) automatically determining an earliest TSTI among the time-slice datasets that is later than the QTI, (ii) identifying each queried field for which the corresponding time-slice data subset with the TSTI determined in part (G)(i) includes a pointer indicating an FVTI data string, (iii) excluding from the electronic querying of the time-series dataset each queried field identified in part (G)(ii), and (iv) for each queried field identified in part (G)(ii), identifying as the latest FVTI data string the corresponding FVTI data string indicated by the pointer;

(H) using one or more electronic processors of the computer system programmed therefor, (i) determining an earliest TSTI among the time-slice datasets that is later than the QTI, (ii) identifying each queried field for which the corresponding time-slice data subset with the TSTI determined in part (H)(i) includes or indicates with a pointer an FVTI data string earlier than the QTI, (iii) excluding from the electronic querying of the time-series dataset each queried field identified in part (H)(ii), and (iv) for each queried field identified in part (H)(ii), identifying as the latest FVTI data string the included or indicated FVTI data string; or (I) using one or more electronic processors of the computer system programmed therefor, (i) identifying each queried field for which a corresponding time-slice data subset, having a corresponding TSTI later than the QTI, includes or indicates with a pointer an FVTI data string earlier than the QTI, (ii) excluding from the electronic querying of the time-series dataset each queried field identified in part (I)(i), and (iii) for each queried field identified in part (I)(i), identifying as the latest FVTI data string the included or indicated FVTI data string.

33. The computer-implemented method of claim 32 further comprising, using one or more electronic processors of the computer system programmed therefor, (i) determining a latest TSTI among the time-slice datasets that is earlier than the QTI, (ii) identifying each queried field for which no FVTI is identified in the time-series dataset that is later than the TSTI determined in part (i) and earlier than the QTI, (iii) excluding from the electronic querying of the time-series dataset each queried field identified in part (ii), and (iv) for each queried field identified in part (ii), identifying as the latest FVTI data string an FVTI data string included in or indicated by a pointer of a corresponding time-slice data subset with the TSTI determined in part (i).

34. The computer-implemented method of claim 32 further comprising, using one or more electronic processors of the computer system programmed therefor, (i) automatically determining an earliest TSTI among the time-slice datasets that is later than the QTI, (ii) identifying each queried field for which the corresponding time-slice data subset with the TSTI determined in part (i) includes a pointer indicating an FVTI data string, (iii) excluding from the electronic querying of the time-series dataset each queried field identified in part (ii), and (iv) for each queried field identified in part (ii), identifying as the latest FVTI data string the corresponding FVTI data string indicated by the pointer.

35. The computer-implemented method of claim 32 further comprising, using one or more electronic processors of the computer system programmed therefor, (i) determining an earliest TSTI among the time-slice datasets that is later than the QTI, (ii) identifying each queried field for which the corresponding time-slice data subset with the TSTI determined in part (i) includes or indicates with a pointer an FVTI data string earlier than the QTI, (iii) excluding from the electronic querying of the time-series dataset each queried field identified in part (ii), and (iv) for each queried field identified in part (ii), identifying as the latest FVTI data string the included or indicated FVTI data string.

36. The computer-implemented method of claim 32 further comprising, using one or more electronic processors of the computer system programmed therefor, (i) identifying each queried field for which a corresponding time-slice data subset, having a corresponding TSTI later than the QTI, includes or indicates with a pointer an FVTI data string earlier than the QTI, (ii) excluding from the electronic querying of the time-series dataset each queried field identified in part (i), and (iii) for each queried field identified in part (i), identifying as the latest FVTI data string the included or indicated FVTI data string.

37. The computer-implemented method of claim 32 wherein any FVTI that indicates a time that is the same as a time indicated by the QTI is included among FVTIs that are treated as being earlier than the QTI, and any TSTI that indicates a time that is the same as a time indicated by the QTI is included among TSTIs that are treated as being earlier than the QTI.

38. The computer-implemented method of claim 32 wherein any FVTI that indicates a time that is the same as a time indicated by the QTI is included among FVTIs that are treated as being later than the QTI, and any TSTI that indicates a time that is the same as a time indicated by the QTI is included among TSTIs that are treated as being later than the QTI.

39. The computer-implemented method of claim 32 wherein any FVTI that indicates a time that is the same as a time indicated by the QTI is included among FVTIs that are treated as being earlier than the QTI, and any TSTI that indicates a time that is the same as a time indicated by the QTI is included among QTIs that are later than the TSTI.

40. The computer-implemented method of claim 32 wherein any FVTI that indicates a time that is the same as a time indicated by the QTI is included among FVTIs that are later than the QTI, and any TSTI that indicates a time that is the same as a time indicated by the QTI is included among TSTIs that are earlier than the TSTI.

41. The computer-implemented method of claim 32 wherein:
(i) the identification of part (B) includes automatically generating one or more additional time-slice datasets with corresponding additional TSTIs; and
(ii) the interrogation of part (C) includes automatically interrogating (1) FV data strings included in, or indicated by corresponding pointers of, the one or more additional time-slice datasets, or (2) FVTI data strings included in, or indicated by corresponding pointers of, the one or more additional time-slice datasets.

42. The computer-implemented method of claim 41 wherein the one or more additional time-slice datasets are generated without altering the multiple time-slice datasets.

43. The computer-implemented method of claim 41 wherein one of the one or more additional time-slice datasets has a corresponding additional TSTI that indicates a time indicated by the QTI.

44. The computer-implemented method of claim 41 further comprising:
(iii) receiving multiple different electronic queries of part (A) having the same QTI;
(iv) for each received query, automatically interrogating (1) FV data strings included in, or indicated by corresponding pointers of, the additional time-slice dataset, or (2) FVTI data strings included in, or indicated by corresponding pointers of, the additional time-slice dataset; and
(v) for each received query, listing, tabulating, graphing, displaying, or enumerating FV or FVTI data strings, among the FV or FVTI data strings interrogated in part (iv), that satisfy one or more search or filter criteria included in the corresponding query of part (iii).

45. The computer-implemented method of claim 44 further comprising deactivating the one or more additional time-slice datasets.

46. A computer system comprising one or more electronic processors and one or more tangible, non-transitory computer-readable media each operatively coupled to one or more of the processors, wherein the computer system is structured, connected, and programmed to perform the method of claim 32.

47. A tangible, non-transitory computer-readable medium encoded with electronic indicia of instructions which, when applied to a computer system, cause the computer system to perform the method of claim 32.

48. The computer-implemented method of claim 32 wherein the corresponding TSTIs of the multiple time-slice datasets are spaced at irregular time intervals.

49. The computer-implemented method of claim 32 wherein the corresponding FVTIs of each one of the multiple data fields differ from the corresponding FVTIs of at least one other of the multiple data fields with respect to regular or irregular time intervals between successive FVTIs for each data field.

* * * * *